(12) United States Patent
Owaku

(10) Patent No.: US 7,832,635 B2
(45) Date of Patent: Nov. 16, 2010

(54) CONTROLLER, INFORMATION STORAGE DEVICE, CONTROL METHOD, INFORMATION STORAGE METHOD, CONTROL PROGRAM, AND COMPUTER-READABLE STORAGE MEDIUM

(75) Inventor: Takeshi Owaku, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1064 days.

(21) Appl. No.: 11/420,827

(22) Filed: May 30, 2006

(65) Prior Publication Data

US 2006/0278703 A1 Dec. 14, 2006

(30) Foreign Application Priority Data

May 31, 2005 (JP) ............................. 2005-160704

(51) Int. Cl.
*G06K 5/00* (2006.01)
(52) U.S. Cl. ..................................................... 235/382
(58) Field of Classification Search .................. 235/382
See application file for complete search history.

(56) References Cited

U.S. PATENT DOCUMENTS

| 5,982,956 | A * | 11/1999 | Lahmi ........................ 382/306 |
| 6,990,502 | B2 * | 1/2006 | Waxman et al. ..................... 1/1 |
| 7,140,534 | B2 * | 11/2006 | Miyazawa et al. .......... 235/375 |
| 7,649,641 | B2 * | 1/2010 | Fujinuma ................... 358/1.14 |
| 2002/0073177 | A1 * | 6/2002 | Clark et al. ................. 709/219 |
| 2002/0170973 | A1 | 11/2002 | Teraura |
| 2003/0225863 | A1 | 12/2003 | Kajino et al. |
| 2004/0035934 | A1 | 2/2004 | Miyazawa et al. |
| 2005/0029353 | A1 | 2/2005 | Isemura et al. |
| 2005/0094183 | A1 * | 5/2005 | Kojima ...................... 358/1.14 |
| 2006/0218191 | A1 * | 9/2006 | Gopalakrishnan ........ 707/104.1 |

FOREIGN PATENT DOCUMENTS

| JP | 2002-337426 | 11/2002 |
| JP | 2004-062870 | 2/2004 |
| JP | 2004-164551 | 6/2004 |
| JP | 2005-101935 | 4/2005 |
| JP | 2005-265902 | 9/2005 |

* cited by examiner

*Primary Examiner*—Daniel A Hess
*Assistant Examiner*—David Tardif
(74) *Attorney, Agent, or Firm*—Renner, Otto, Boisselle & Sklar, LLP

(57) ABSTRACT

A controller according to the present invention is a controller for controlling a digital multifunctional device which performs job process operation including at least one of image reading operation and image forming operation. The controller includes: a user information acquiring section for acquiring user information from an outside; a wireless tag information acquiring section for acquiring information stored in a wireless tag attached to a book; an owner information judging section for judging whether owner information indicating an owner of the book is included or not in the information acquired by the wireless information acquiring section; and an operation allowance section for comparing the owner information with the user information when the owner information is included, so as to allow the job process operation when the owner information is identical with the user information and so as not to allow the job process operation when the user information is not included. As a result, it is possible to prevent illegal image formation and illegal image reading.

5 Claims, 9 Drawing Sheets

FIG. 2

| BOOK INFORMATION ||
|---|---|
| PERSONAL ID OF OWNER OF BOOK ||
| NUMBER OF COPIABLE SHEETS ||
| TOTAL NUMBER OF COPIED SHEETS ||
| DATE 1 | MONTHLY NUMBER OF COPIED SHEETS 1 |
| ..... | ............... |
| DATE N | MONTHLY NUMBER OF COPIED SHEETS N |

CONTROLLER, INFORMATION STORAGE DEVICE, CONTROL METHOD, INFORMATION STORAGE METHOD, CONTROL PROGRAM, AND COMPUTER-READABLE STORAGE MEDIUM

This non-provisional application claims priority under 35 U.S.C. §119(a) on Patent Application No. 2005-160704 filed in Japan on May 31, 2005, the entire contents of which are hereby incorporated by reference.

FIELD OF THE INVENTION

The present invention relates to a controller for controlling job process operation including at least either image reading operation or image forming operation carried out by a digital multifunctional device capable of preventing illegal copy of a product such as a book (document). To be more specific, the present invention relates to (i) a controller for controlling job process operation performed with respect to a book (document) including an information storage medium which stores owner information for indicating the owner of the book (document), and (ii) an information storage device for storing the owner information in the information storage medium.

BACKGROUND OF THE INVENTION

Recently, digital multifunctional devices with high performance have been commercially available and accordingly it is easy to form images of products such as books so as to form copies similar to originals. Further, when images of the books and the like are read and made into image data, recent prevalence of the Internet allows distribution of the image data to unspecified number of users.

Although books and the like are protected under copyrights, there frequently occurs such damage that the images of the books and the like are read and made into image data and distributed without permission of copyright holders. In order to prevent such illegal distribution of image data, there is proposed a technology disclosed in Japanese Unexamined Patent Publication No. 62870/2004 (published on Feb. 26, 2004: Document 1) for example.

To be specific, Document 1 discloses a system in which: permitting conditions under which a user can use desired contents data are informed to a server storing the contents data, and when the server permits the contents data to be used under the permitting conditions, the user can receive the contents data from the server, thereby allowing personal use of the contents data and preventing illegal copy of the contents data. In this way, in the case of digitalized products, there is proposed a system which allows copy of the contents data only when the contents data are personally used.

On the other hand, in the case where products have physical forms such as books, an example of a technique for preventing illegal copy of the books with a copying machine is disclosed in Japanese Unexamined Patent Publication No. 164551/2004 (published on Jun. 10, 2004: Document 2) for example.

Document 2 discloses a technique in which: in a storage medium attached to a book, information indicating whether copy of the book is allowable or not is stored, and copy of the book is controlled based on the information.

Further, in the technique disclosed in Document 2, when it is judged that there is no user information in the storage medium attached to the book, user information is written in the storage medium before an image of the book is copied.

However, with the conventional arrangements, it is impossible to prevent illegal copy of images of products having physical forms such as books while normally copying images of the books.

To be specific, in Document 2, in the storage medium attached to a book, information indicating whether copy of the book is allowable or not is stored, and copy of the book is controlled based on the information. In this case, for example, even the owner of the book is disallowed to copy images of the book. Namely, in Document 2, whether image reading is allowable or not is set regardless of whether the person who is to perform image reading is the legal owner of the book or not.

Further, in the technique disclosed in Document 2, when it is judged that there is no user information in the storage medium attached to the book, user information is written in the storage medium before an image of the book is copied. Next time the image of the book is to be copied, whether copy of the image is allowable or not is determined based on the user information. At that time, when an illegal user, who is not a legal owner of the book in which the user information is not stored, copies the image of the book, user information concerning the illegal user is automatically written in a storage medium attached to the book. When the legal owner of the book attempts to copy the image of the book after the user information concerning the illegal user has been written, the legal owner cannot copy the image of the book. Namely, in the technique disclosed in Document 2, when user information is not stored in the storage medium attached to the book, user information is automatically stored in the storage medium regardless of whether the user information concerns the legal owner or not and then copy of the image is performed. As a result, illegal copy of the image cannot be prevented.

SUMMARY OF THE INVENTION

The present invention was made in view of the foregoing problems, and its object is to provide a controller and an information storage device, each of which allows control of image reading operation and/or image forming operation carried out by a digital multifunctional device capable of preventing illegal formation/reading of an image of a document while allowing an owner of the document to perform formation/reading of the image.

In order to solve the foregoing problems, a controller according to the present invention is a controller for controlling a job process section which performs job process operation including at least one of (i) image reading operation for reading a document so as to acquire image data and (ii) image forming operation for forming an image indicated by the image data on a sheet, said controller comprising: a user information acquiring section for acquiring, from an outside, user information indicating a user who uses the job process section; a wireless tag information acquiring section for acquiring information stored in an information storage medium attached to the document; an owner information judging section for judging whether owner information indicating an owner of the document is included or not in the information acquired by the wireless tag information acquiring section; and an operation allowance section for (i) comparing the owner information with the user information in case where the owner information is included, so as to allow the job process operation when the owner information is identical with the user information and so as not to allow the job process operation when the owner information is not identical with the user information and (ii) not allowing the job process operation when the user information is not included.

In order to solve the foregoing problems, a method according to the present invention is a method for controlling a job process section which performs job process operation including at least one of (i) image reading operation for reading a document so as to acquire image data and (ii) image forming operation for forming an image indicated by the image data on a sheet, said method comprising the steps of: (i) acquiring user information indicating a user who uses the job process section from an outside; (ii) acquiring information stored in an information storage medium attached to the document; (iii) judging whether owner information indicating an owner of the document is included or not in the information acquired in the step (ii); and (iv) comparing the owner information with the user information in case where it is judged in the step (iii) that the owner information is included in the information acquired in the step (ii), so as to allow the job process operation when the owner information is identical with the user information and so as not to allow the job process operation when the owner information is not identical with the user information, and not allowing the job process operation in case where it is judged in the step (iii) that the owner information is not included in the information acquired in the step (ii).

Image data indicating an image to be formed on a sheet in the image forming operation may be image data read out in the image reading operation or may be image data acquired from the outside.

The controller controls job process operation including at least either image reading operation or image forming operation performed by the job process section. Note that, the controller may control both of the image reading operation and the image forming operation or may control either of the two operations.

Further, the information storage medium is attached to the document and stores, for example, owner information indicating the owner of the document. The information storage medium may be at least one of a storage device (storage element) for storing data, such as an IC tag (wireless tag) and a flash memory, paper, and the like.

The user information acquiring section acquires user information for indicating the user who causes the job process section to perform job process operation. To be specific, the user information acquiring section may acquire the user information in such a manner that: the user information acquiring section acquires information inputted by the user or reads out the user information from a user information storage medium for storing user information. The user information storage medium may be at least one of a storage device (storage element) for storing data, such as an IC tag (wireless tag), an IC card, and a flash memory, a paper, and the like.

With the arrangement, in a case where the information storage medium attached to the document stores the owner information, the owner information is compared with the user information acquired from the outside. When the user information is identical with the owner information, the controller allows the job process section to perform the job process operation. On the other hand, in a case where the information storage medium does not store the owner information, the controller does not allow the job process section to perform the job process operation.

Namely, when the user information having the same information as the owner information indicating the owner of the document is read out, the job process operation is allowed. On the other hand, when the owner information is not stored in the document, namely, the owner of the document is unknown, the job process operation is not allowed.

Therefore, with the arrangement, it is possible to allow only the owner of the document to perform the job process operation and to prevent a person other than the owner of the document from performing the job process operation. As a result, it is possible to prevent the job process operation from being performed for a purpose other than personal use.

Further, in order to solve the foregoing problems, an information storage device according to the present invention is an information storage device, including a written information forming section for storing at least owner information indicating an owner of a document in an information storage medium attached to the document, said information storage device comprising: a written information acquiring section for acquiring the owner information from an outside; a storage information acquiring section for acquiring information stored in the information storage medium; and an information judging section for judging whether the owner information is included or not in the information acquired by the storage information acquiring section, wherein the written information forming section stores the owner information acquired by the written information acquiring section in the information storage medium when the written information forming section judges that the owner information is not included in the information acquired by the storage information acquiring section.

Further, in order to solve the foregoing problems, a method according to the present invention is a method for storing at least owner information indicting an owner of a document in an information storage medium attached to the document, said method comprising the steps of (i) acquiring the owner information from an outside, (ii) acquiring information stored in the information storage medium, (iii) judging whether the owner information is included or not in the information acquired in the step (ii), and (iv) storing the owner information acquired in the step (i) in the information storage medium when it is judged that the owner information is not included in the information acquired in the step (ii).

The information storage device stores various items of information at least including owner information in the information storage medium such as a wireless IC tag and the like attached to the document.

With the arrangement, the owner information indicating the owner of the document is stored based on the information stored in the information storage medium. To be specific, when the owner information is not stored in the information storage medium, the owner information acquired from the outside is stored. As a result, it is possible to write the owner information indicating the owner of the document.

For a fuller understanding of the nature and advantages of the invention, reference should be made to the ensuing detailed description taken in conjunction with the accompanying drawings.

BRIEF DESCRIPTION OF THE DRAWINGS

FIG. 2 illustrates a data structure of wireless tag information stored in a wireless tag.

DESCRIPTION OF THE EMBODIMENTS

The following explains an embodiment of the present invention. Namely, a controller according to the present embodiment for controlling an image forming apparatus prevents illegal copy of a book except for a personal use.

To be specific, the controller reads out owner information concerning an owner of a document (including a product such as a book) from an information storage medium such as an IC tag and reads out user information concerning a user who is to cause the image forming apparatus to perform job process operation including at least one of (i) operation for reading an image of the document and (ii) operation for forming an image of the document. Then, the controller compares the owner information with the user information. When both of the information are identical with each other, the controller allows the image forming apparatus to perform the job process operation. When the owner information is not stored in the information storage medium, the controller does not allow the image forming apparatus to perform the job process operation.

Further, an information storage device which writes the user information in the information storage medium attached to the document reads out information stored in the information storage medium. When the information storage device judges that user information is not stored in the information storage medium, the information storage device writes user information in the information storage medium.

Note that, the following explains an example in which the controller and the image forming apparatus are combined with each other. However, the present invention is not limited to this and may be arranged so that the controller is provided separately from the image forming apparatus. Further, the following explains the image forming apparatus by using, as an example, a digital multifunctional device including image forming function and image reading function.

Further, a document in the present invention is not particularly limited as long as the document includes a product including at least one of a sheet and a book to which images are stored and images of the document can be read out. The following explains a case where the document is a book. Further, the following explains the job process operation by using, as an example, copy operation in which an image of a document is read out and formed.

Figure 1:
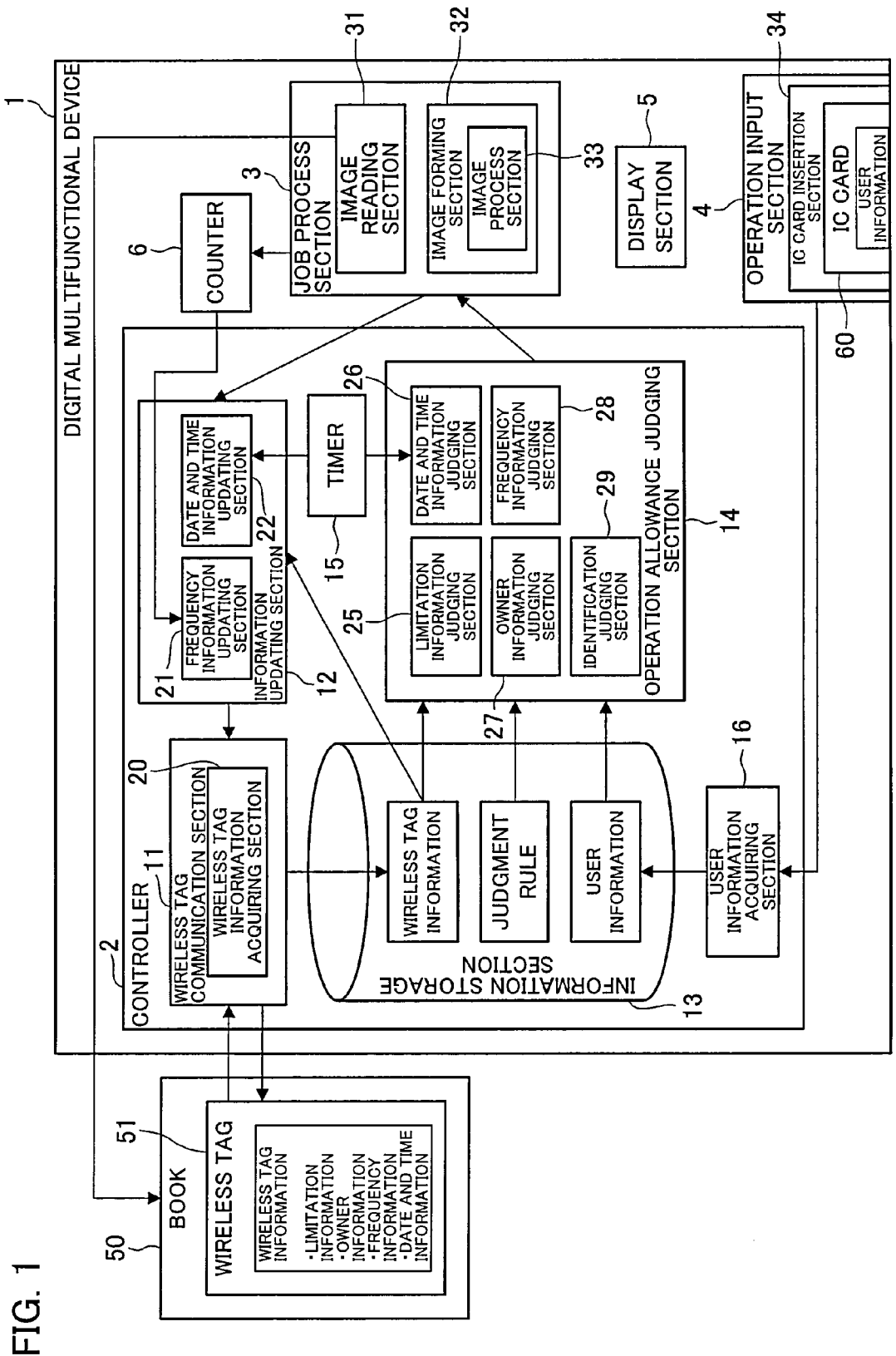
FIG. 1 is a functional block diagram schematically illustrating a structure of a digital multifunctional device (image forming apparatus) according to the present embodiment.

FIG. 1 is a block diagram schematically illustrates a structure of a digital multifunctional device 1 (image forming apparatus) according to the present embodiment.

First, a book 50 is explained. Information stored in the book 50 is read out by the digital multifunctional device 1, and the book 50 contains, on its sheets, images to be read out as image data. Further, the book 50 is provided with a wireless tag 51 which stores information different from the images. To be specific, the book 50 has the images to be optically read out and includes the wireless tag 51 which stores information (wireless tag information) concerning the book 50.

Here, the following explains the wireless tag 51 attached to the book 50 and wireless tag information stored in the wireless tag 51.

The wireless tag 51 is a tag having a wireless communication function, such as an IC tag or RFI tag (Rapid Frequency Identification Tag). The wireless tag 51 includes a wireless transmission/reception section and a minute microcomputer having a CPU and a memory (various kinds of ROM and RAM).

FIG. 2 illustrates a data structure of the wireless tag information stored in the wireless tag 51. As illustrated in FIG. 2, the wireless tag information includes book information, personal ID of an owner of the book 50, the number of copiable sheets, the total number of copied sheets, and copy history information.

The book information concerns the book 50 into which the IC tag is implanted. An example of the book information is at least one of the name of the book 50, the producer (author) of the book 50, the total number of pages of the book 50, the size of the book 50, and the like.

Note that, the book information cannot be rewritten by the later-mentioned digital multifunctional device 1 and the like. In the present embodiment, the book information is written in the wireless tag 51 when the book is bound. Thereafter, the book information is read-only.

Further, the book information includes copy limitation information and/or scan limitation information (limitation information) used to protect copyright. The copy limitation information limits the number of copying and/or scanning the book 50 and indicates that reading and formation of images of the book 50 are (i) allowable, (ii) allowable in a limited number, (iii) disallowable etc.

The personal ID (owner information) of the owner of the book 50 is information concerning the owner of the book 50. To be specific, the personal ID of the owner of the book 50 is information for identifying a person, such as the name of the owner and information recited in the Basic Resident Register.

The number of copiable sheets is information indicating how many sheets are copiable, which is set so that copying is not performed for other than the personal use. Further, the total number of copied sheets is information indicating how many times the book 50 has been copied so far.

The copy history information indicates when the book 50 was copied.

Note that, the number of copied sheets may be cancelled after a predetermined time has passed. In this case, the total number of copied sheets may be rewritten based on the copy history information which includes the number of copied sheets per a predetermined time (e.g. per a month).

Further, as long as the wireless tag 51 stores at least the personal ID of the owner of the book 50, the wireless tag 51 may store other information according to necessity. Further, the wireless tag 51 has storage regions each of which is used to store information specific to the region. Namely, in that case, the wireless tag 51 includes a book information storage region for storing book information, an ID information storage region for storing the personal ID of the owner of the book 50, a number-of-copiable-sheet storage region for storing the number of copiable sheets, a total-number-of-copied-sheet storage region for storing the total number of copied sheets, and a history information storage region for storing copy history.

Here, the following explains the digital multifunctional device 1 according to the present embodiment. As illustrated in FIG. 1, the digital multifunctional device 1 includes a job process section 3, a controller 2, a display section 5, an operation input section 4 and a counter 6.

The job process section 3 processes jobs instructed by the user. The job process section 3 includes an image reading section 31 and an image forming section 32.

The image reading section 31 optically reads the book 50 (document) placed on a document placement table (not shown) in the digital multifunctional device 1 and converts an image of the book 50 into an electric signal indicative of image data. Namely, the image reading section 31 reads the book 50 so as to acquire the image data.

In a case where the document is the book 50, the user places the book 50 on the document placement table so that a page which the user wants to copy faces the table, and instructs copying one by one by pressing a start button. In this case, the image reading section 31 detects presence/absence of the document or size of the document by use of an optical sensor in response to an open/close operation of a document cover as a trigger. Further, the image reading section 31 may automatically turn pages of the book 50, thereby reading a plurality of pages at once.

Further, the image forming section 32 forms an image on a sheet on the basis of image data acquired by the image reading section 31 and image data acquired from an outside. Note that, the image forming section 32 has an image process section 33. The image forming section 32 forms an image after processing the image data so that the image data becomes data suitable for image forming.

The image process section 33 corrects hue and gradation of the image data read out by the image reading section 31 so that the image data is in accordance with characteristics of the image forming section 32. Further, the image process section 33 may be arranged so that: when the document 50 under copyright protection is copied, the image process section 33 embeds, in the image data, a copy prevention pattern or copy inhibition information so that a copy output is not further copied. Note that, the image forming section 32 and the image reading section 31 are not detailed here because the image forming section 32 and the image reading section 31 are conventional and well-known sections included in an image forming apparatus such as a digital multifunctional device.

The controller 2 controls a job process operation carried out by the job process section 3. Namely, the controller 2 controls the job process operation. The structure of the job process section 3 is detailed later.

The display section 5 processes various kinds of information. To be specific, the display section 5 displays process conditions in the job process operation, various warnings from the controller 2, and the like.

The operation input section 4 is a section via which various kinds of information are inputted to the digital multifunctional device 1 from the outside. To be specific, various kinds of information such as process conditions under which a job is processed, a command for starting a job process, and user information concerning a user who uses the digital multifunctional device 1 are inputted. In the present embodiment, the operation input section 4 includes an IC card insertion section 34. An IC card 60 (recording medium) is inserted into the IC card insertion section 34.

The counter 6 counts (measures) the number of the job process operation carried out by the job process section 3.

As described above, this arrangement allows the digital multifunctional device 1 to carry out the job process operation.

Here, the controller 2 is detailed. The controller 2 reads wireless tag information stored in the wireless tag 51 attached to the book 50 while reading user information stored in the IC card 60 inserted into the IC card insertion section 34 of the digital multifunctional device 1, and compares the wireless tag information with the user information, thereby judging whether the job process section 3 is to be operated or not. Further, the controller 2 is capable of rewriting the total number of copied sheets and copy history information (date and time information) stored in the wireless tag 51. The following details the controller 2. Note that, book information, owner information, and the number of copiable sheets (frequency information) stored in the wireless tag 51 cannot be rewritten.

As illustrated in FIG. 1, the controller 2 at least includes a wireless tag communication section 11, a user information acquiring section 16 (user information acquiring means), and operation allowance judging section 14 (operation allowance means). The digital multifunctional device 1 includes an information storage section 13, an information updating section 12, and a timer 15 according to necessity. Note that, the following explains a case where all the sections are provided.

The wireless tag communication section 11 reads data from and writes data in an IC tag embedded in the book 50. To be specific, the wireless tag communication section 11 reads wireless tag information (including the user information) stored in the wireless tag 51 (wireless IC tag) serving as an information storage medium attached to the book 50. Further, the wireless tag communication section 11 rewrites the total number of copied sheets and the copy history information out of information stored in the wireless tag 51. The wireless tag communication section 11 includes a wireless tag information acquiring section 20 (information acquiring means) for acquiring wireless tag information stored in the wireless tag 51.

The user information acquiring section 16 acquires user information concerning a user who uses the digital multifunctional device 1 so as to carry out a job process with respect to the book 50. To be specific, the user information acquiring section 16 acquires user information stored in the IC card 60 inserted by the user into the IC card insertion section 34 of the digital multifunctional device 1 or user information inputted by the user via the operation input section 4.

The information storage section 13 stores wireless tag information acquired by the wireless tag communication section 11 and user information acquired by the user information acquiring section 16. Further, the information storage section 13 stores a judgment rule by which the operation allowance judging section 14 judges whether a job process operation is allowable or not.

The timer 15 measures date and time and is referred to when the time of copying the document is recorded.

The information updating section 12 generates, via the wireless tag communication section 11, data used to update the total number of copied sheets and the copy history information out of the wireless tag information stored in the wireless tag 51 attached to the book 50.

The information updating section 12 includes a frequency information updating section 21 and a date and time information updating section 22. The frequency information updating section 21 acquires (i) the total number of copied sheets out of the wireless tag information stored in the information storage section 13 and (ii) the number of newly copied sheets counted by the counter 6 and adds the total number of copied sheets and the number of newly copied sheets so as to obtain the newly calculated total number of copied sheets. Further, the date and time information updating section 22 causes the timer 15 to measure the data and time when a new job process is carried out and generates date and time information to be written in the wireless tag information.

The operation allowance judging section 14 judges whether the job process operation of the job process section 3 is allowable or not based on the judgment rule stored in the information storage section 13. The operation allowance judging section 14 includes a limitation information judging section 25, a date and time information judging section 26, an owner information judging section 27, a frequency information judging section 28 and an identification judging section 29 so as to judge whether the job process operation is allowable or not.

To be specific, the operation allowance judging section 14 judges whether the job process operation is allowable or not based on (i) judgment whether owner information is included or not in the wireless tag information and (ii) judgment whether the owner information is identical with the user information when the owner information is included in the wireless tag information.

Further, in the present embodiment, the operation allowance judging section 14 judges whether limitation information is included or not in the wireless tag information before carrying out the foregoing two judgments, and judges whether the job process operation is allowable or not based on the judgment. Further, in a case where the date and time information is included in the wireless tag information, the operation allowance judging section 14 may judge whether the job process operation is allowable or not based on the date and time information, and in a case where the frequency information is included in the wireless tag information, the operation allowance judging section 14 may judge whether the job process operation is allowable or not based on the frequency information.

Here, the following explains a method according to the present embodiment for preventing illegal copy. First, the IC tag (wireless tag 51) is originally embedded in a product such as the book 50. When the user purchases the book 50, owner information (information in the IC card 60 and the like) specific to the user is written in the IC tag of the product by use of a later-mentioned information input device 100. When the user intends to copy the book 50 by use of the digital multifunctional device 1, the controller 2 reads out user information concerning the user who intends to use the digital multifunctional device 1, and compares the user information with the owner information stored in the IC tag of the book 50. When the result of comparison shows that the user information is different from the owner information, the controller 2 judges that a person different from the purchaser of the book 50 intends to copy the book 50 and determines whether the book 50 may be copied or not (namely, determines whether a job process operation is allowable or not). As a result, it is possible to prevent illegal copy of the book 50 carried out by a person different from the purchaser of the book 50.

Further, a storage region for storing the number of copiable sheets and/or the number of copiable pages is provided in the IC tag. When the user copies the book 50, the number of copied sheets and/or the number of copied pages is written in the IC tag. When the controller 2 judges that the number of copied sheets and/or the number of copied pages exceeds a predetermined number, copy is disallowed. As a result, it is possible to prevent illegal copy in which the book 50 is copied exceeding the number of copiable sheets and/or the number of copiable pages.

With reference to FIG. 1, the following details a method for preventing the illegal copy. First, when the user gives a copy start command and it is detected that the book 50 is placed on the document placement table, the wireless tag communication section 11 judges whether the wireless tag 51 is attached to the book 50 or not. When the wireless tag communication section 11 judges that the wireless tag 51 is attached to the book 50, the wireless tag communication section 11 reads out wireless tag information stored in the wireless tag 51. The wireless tag communication section 11 stores the read out wireless tag information in the information storage section 13.

Next, the user information acquiring section 16 judges whether the IC card 60 is inserted or not into the IC card insertion section 34 provided in the digital multifunctional device 1. When the IC card 60 is inserted into the IC card insertion section 34, the user information acquiring section 16 acquires user information stored in the IC card 60. The user information acquiring section 16 stores the acquired user information in the information storage section 13. Note that, when the IC card 60 is not inserted, the user information acquiring section 16 causes the display section 5 to display a warning for requesting the user to provide the user information.

The operation allowance judging section 14 informs the job process section 3 of whether copy is allowable or not based on the wireless tag information, the user information, and the judgment rule stored in the information storage section 13. When the operation allowance judging section 14 informs that copy is not allowable, the operation allowance judging section 14 causes the display section 5 to display that copy is disallowable.

When the job process section 3 is informed by the operation allowance judging section 14 that copy is allowable, the job process section 3 performs copy operation. To be specific, the image reading section 31 reads an image of the book 50 placed on the document placement table so as to acquire image data, and the image forming section 32 forms an image on a sheet on the basis of the image data. At that time, the counter 6 counts frequency with which copy operation is performed. Then, the counter 6 informs the frequency information updating section 21 of the frequency with which copy operation is performed.

Next, when the information updating section 12 of the controller 2 detects that the job process section 3 has finished copy operation, the information updating section 12 causes the frequency information updating section 21 to generate frequency information which should be written in the wireless tag 51 attached to the book 50. To be specific, the frequency information updating section 21 acquires the total number of copied sheets stored in the wireless tag 51 from the wireless tag information stored in the information storage section 13 and adds the value informed by the counter 6 to the total number of copied sheets. Further, the date and time information updating section 22 acquires date and time at present from the timer 15. Further, the information updating section 12 stores, via the wireless tag communication section 11, in the wireless tag 51 of the book 50, (i) the newly calculated total number of copied sheets generated by the frequency information updating section 21 and (ii) the date and time information generated by the date and time updating section 22. In this way, the digital multifunctional device 1 prevents illegal copy.

Note that, the foregoing explains an arrangement in which user information is read out from the IC card 60. However, the present invention may be arranged so that the user information is acquired via the operation input section 4. To be specific, the present invention may be arranged so that the user inputs the user information via the operation input section 4 and the user information acquiring section 16 acquires the user information.

Figure 3:
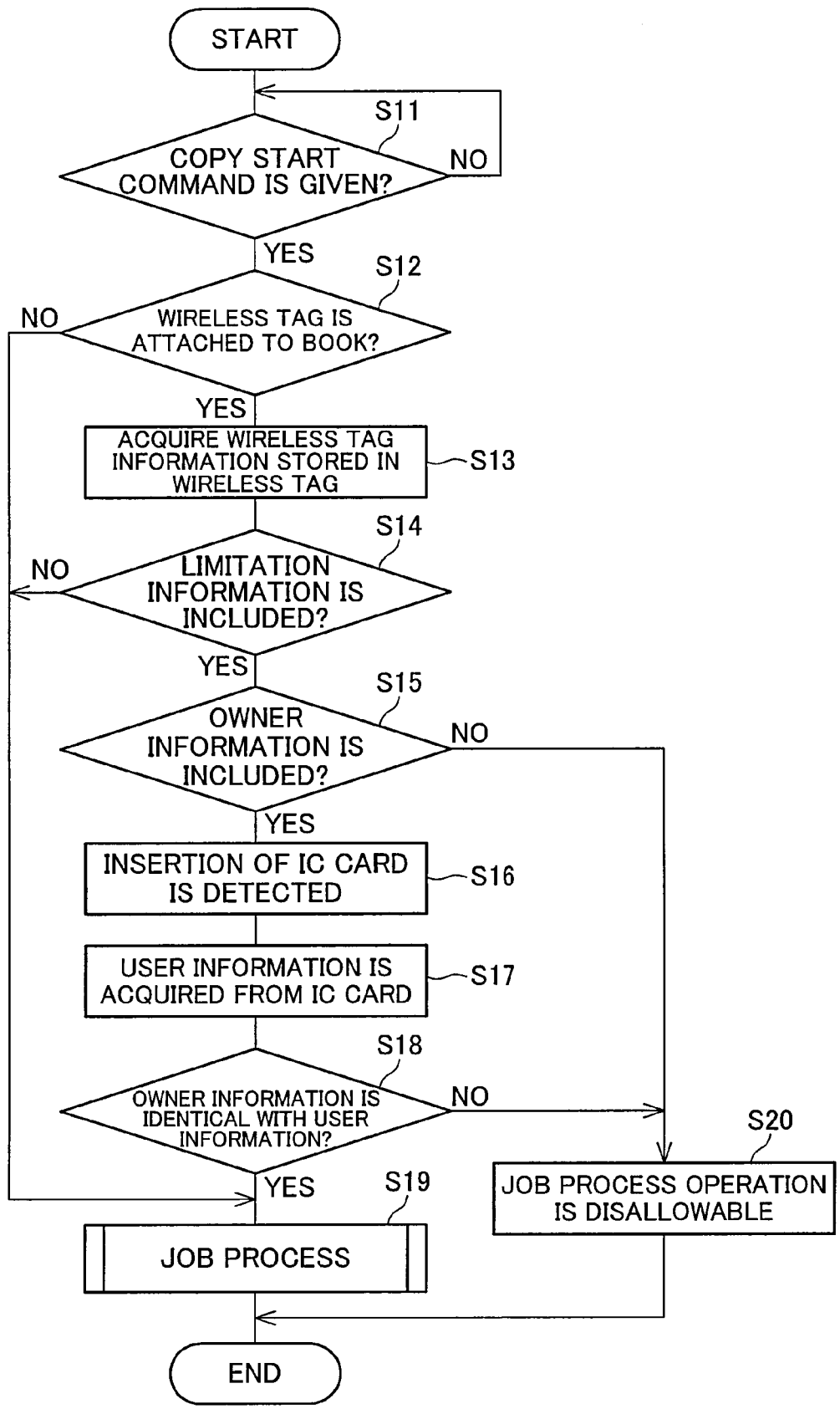
FIG. 3 is a flow chart illustrating a method for controlling the digital multifunctional device so that the digital multifunctional device does not perform illegal copy.

FIG. 3 is a flow chart explaining a method for preventing illegal copy in the digital multifunctional device 1. With reference to FIG. 3, the following explains a process for limiting the number of copies carried out by the digital multifunctional device 1.

First, the controller 2 judges whether or not the book 50 (document) is placed on the document placement table and the user has given a copy start command (S11). To be specific, when the image reading section 31 of the job process section 3 detects that the book 50 is placed on the document placement table, the image reading section 31 transmits, to the controller 2, information indicating that the book 50 is placed on the document placement table. The controller 2 receives, from the digital multifunctional device 1, information indicating that the copy start button has been pressed, thereby noticing reception of the copy start command from the user.

Then, when it is judged in the step S11 that the user has given the copy start command (Yes in S11), the wireless tag communication section 11 judges whether the book 50 includes the wireless tag 51 or not (S12).

Next, when it is judged in the step S12 that the book 50 includes the wireless tag 51 (Yes in S12), the wireless tag communication section 11 acquires, from the wireless tag 51 attached to the book 50, the wireless tag information including the owner information concerning the owner of the book 50 (S13). Then, the wireless tag communication section 11 stores the acquired wireless tag information in the information storage section 13. On the other hand, when it is judged in the step S12 that the wireless tag 51 is not attached to the book 50, the process goes to a later-mentioned step S19.

Next, the operation allowance judging section 14 causes the limitation information judging section 25 to judge whether the wireless tag information stored in the information storage section 13 includes limitation information for limiting or prohibiting copy (S14).

When it is judged in the step S14 that the wireless tag information includes the limitation information (Yes in S14), the operation allowance judging section 14 causes the owner information judging section 27 to judge whether the wireless tag information stored in the information storage section 13 includes the owner information or not (S15). On the other hand, when it is judged in the step S14 that the wireless tag information does not include the limitation information, namely, copy is not limited (No in S14), the process goes to S19.

When it is judged in the step S15 that the wireless tag information includes the owner information (Yes in S15), the user information acquiring section 16 detects whether the IC card 60 is inserted into the IC card insertion section 34 of the digital multifunctional device 1 or not (S16).

When it is judged in the step S16 that the IC card 60 is inserted into the IC card insertion section 34, the user information acquiring section 16 acquires the user information stored in the IC card 60 (S17). Then, the user information acquiring section 16 stores the acquired user information in the information storage section 13.

Next, the operation allowance judging section 14 causes the identification judging section 29 to judge whether or not the owner information stored in the information storage section 13 is identical with the user information (S18).

When it is judged in the step S18 that the owner information is identical with the user information (Yes in S18), the controller 2 transmits, to the job process section 3, allowance information indicating that copy operation is allowable. The job process section 3 receives the allowance information and performs job process operation (S19). To be specific, the job process section 3 reads the book 50 placed on the document placement table so as to obtain image data, and forms an image on a sheet on the basis of the obtained data. Note that, another example of controller 2 judging whether copy operation is allowable or not is mentioned later.

When it is judged in the step S15 that the wireless tag information stored in the information storage section 13 does not include the owner information (No in S15), or when it is judged in the step S18 that the owner information is not identical with the user information (No in S18), the operation allowance judging section 14 transmits, to the job process section 3, disallowance information indicating that copy operation is not allowable (S20). The job process section 3 receives the disallowance information and does not perform copy operation.

In this way, when it is judged that the wireless tag 51 does not include the owner information or when it is judged that the owner information is not identical with the user information, the controller 2 according to the present embodiment transmits, to the job process section 3, the disallowance information indicating that copy operation is disallowable.

Here, in addition to the foregoing judgment, the following explains a method for judging whether copy operation is allowable or not when the wireless tag information stored in the information storage section 13 includes the accumulated number of copied sheets (total number of copied sheets) and the number of copiable sheets (number of allowed copies). To be specific, the following explains another example of the job process which is equal to the step S19 in the foregoing explanation.

Figure 4:
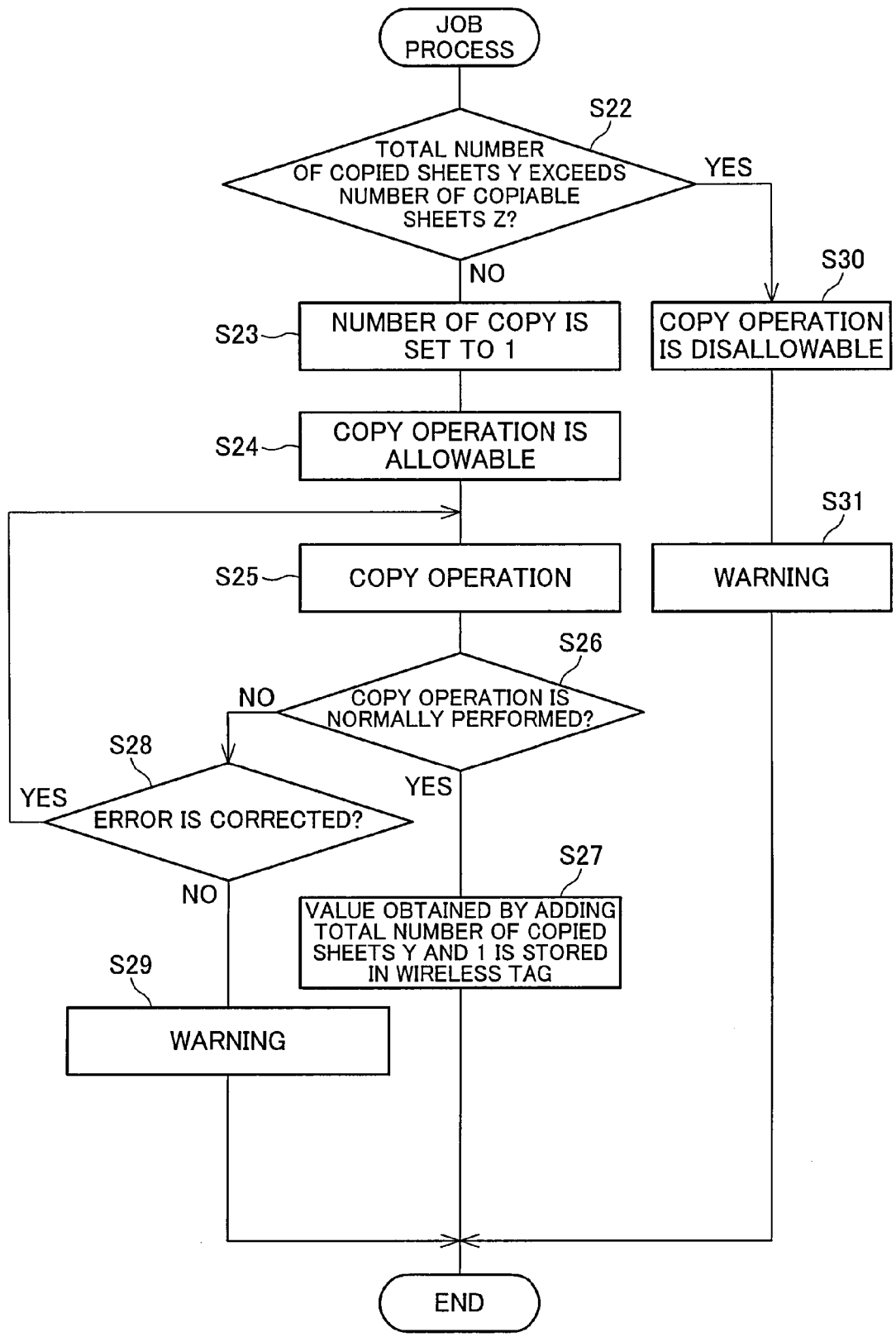
FIG. 4 is a flow chart illustrating an example of a job process.

FIG. 4 is a flow chart explaining an example of the job process.

When it is judged in the step S18 that the owner information is identical with the user information, the operation allowance judging section 14 causes the frequency information judging section 28 to read out the accumulated number of copied sheets and the number of copiable sheets included in the wireless tag information stored in the information storage section 13 and judges whether the accumulated number of copied sheets (Y) exceeds the number of copiable sheets (Z) (S22).

Then, when it is judged in the step S22 that the accumulated number of copied sheets does not exceed the number of copiable sheets (No in S22), the operation allowance judging section 14 sets the number of copiable sheets to 1 (S23), and transmits, to the job process section 3, copy operation allowance information indicating that the number of allowable copies is limited (S24).

Next, the job process section 3 receives the copy operation allowance information and performs copy operation (S25). To be specific, the job process section 3 performs copy operation only 1 time (with respect to only 1 sheet). Then, the job process section 3 judges whether copy operation has been performed normally or not (S26). Then, when it is judged in the step S26 that copy operation has been performed normally (Yes in S26), the job process section 3 causes the counter 6 to inform the information updating section 12 of "1" which is the number of newly performed copy.

The information updating section 12 receives the information of "1" and reads out the accumulated number of copied sheets included in the wireless tag information stored in the information storage section 13, adds the "1" to the accumulated number of copied sheets so as to obtain the newly accumulated number of copied sheets, and stores, via the wireless tag communication section 11, the newly accumulated number of copied sheets in the wireless tag 51 attached to the book 50 (S27).

On the other hand, when it is judged in the step S26 that copy operation has not been performed normally (No in S26), the job process section 3 judges whether the user has corrected the error or not (S28). When the error is corrected (Yes in S28), the process goes back to the process in the step S25. When the error is not corrected for a predetermined time (No in S28), the job process section 3 causes the display section 5 to display a warning (S29) and finishes the process.

Further, when it is judged in the step S22 that the accumulated number of copied sheets exceeds the number of copied sheets (Yes in S22), the operation allowance judging section 14 transmits, to the job process section 3, disallowance information indicating that copy operation is disallowable (S30), causes the display section 5 to display a warning for informing the user that copy is disallowable, and finishes the process.

Note that, in the explanation, whether copy operation is allowable or not is judged based on (i) whether the limitation information is included in the wireless tag information or not, (ii) whether the user information exists or not, and (iii) whether the owner information is identical with the user information or not. However, in addition to the above judgments, the present invention may be arranged so that whether copy operation is allowable or not is judged based on whether the number of copied sheets exceeds the number of copiable sheets. The following explains this.

Figure 5:
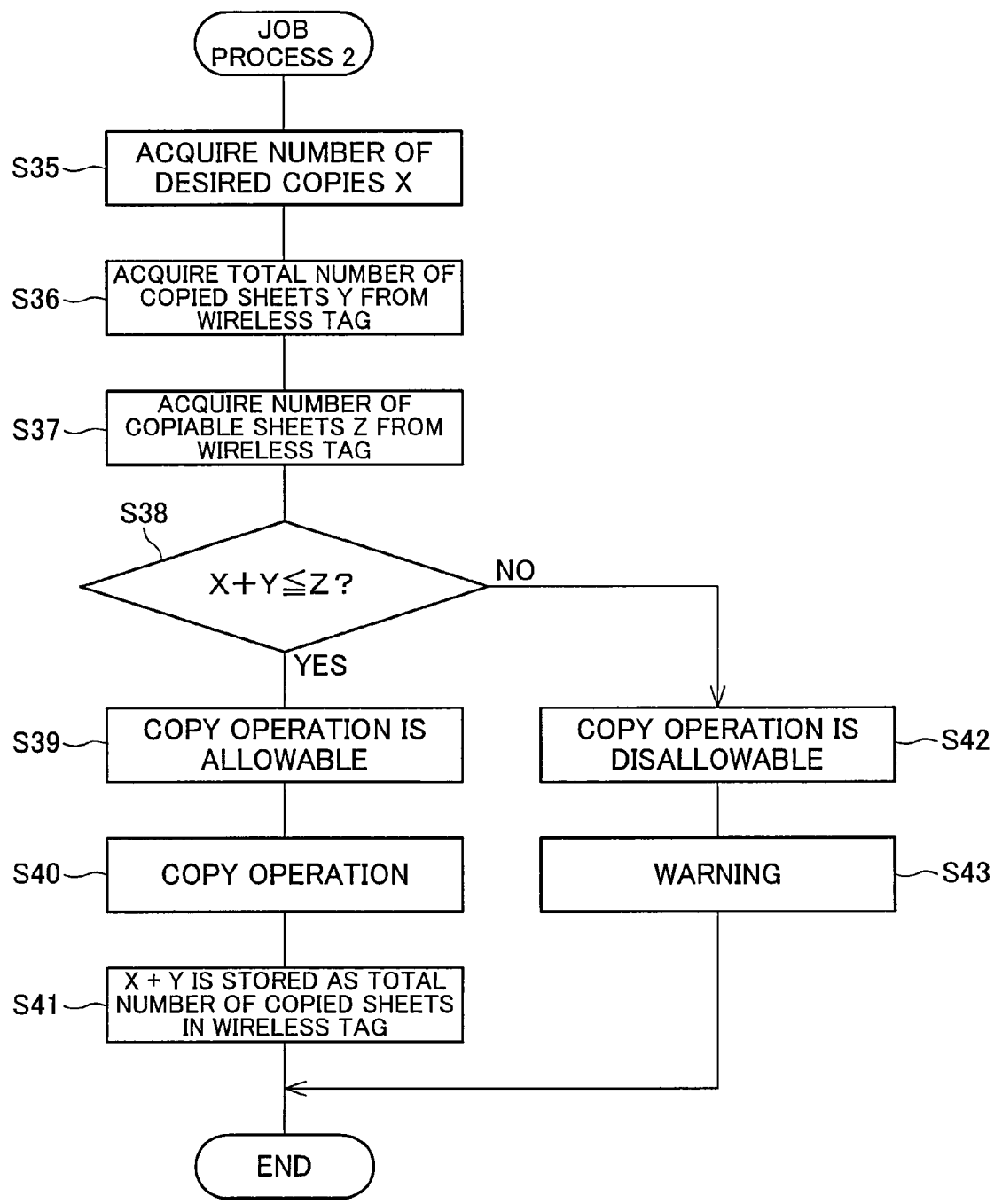
FIG. 5 is a flow chart illustrating another example of a job process.

FIG. 5 is a flow chart explaining Job Process 2 in which: whether copy operation is allowable or not is judged based on whether the number of copied sheets exceeds the number of copiable sheets.

When it is judged in the step S18 that the owner information is identical with the user information, the operation allowance judging section 14 acquires the number of desired copies (X) inputted by the user (S35). This number is the number of sheets on which the user wants to copy the book 50.

Next, the operation allowance judging section 14 causes the frequency information judging section 28 to acquire the accumulated number of copied sheets (Y) included in the wireless tag information stored in the information storage section 13 (S36). Further, the operation allowance judging section 14 causes the frequency information judging section 28 to acquire the number of copiable sheets (Z) included in the wireless tag information stored in the information storage section 13 (S37).

Then, the operation allowance judging section 14 causes the frequency information judging section 28 to judge whether the number obtained by adding the number of desired copies (X) and the accumulated number of copied sheets (Y) is not more than the number of copiable sheets (Z). To be specific, the operation allowance judging section 14 judges whether the relation $X+Y \leq Z$ is satisfied or not (S38).

When it is judged in the step S38 that the relation $X+Y \leq Z$ is satisfied (Yes in S38), the operation allowance judging section 14 transmits, to the job process section 3, allowance information indicating that copy operation is allowable (S39).

The job process section 3 receives the allowance information and performs copy operation (S40). When the copy operation is finished, the job process section 3 transmits, to the information updating section 12, the number of copied sheets counted by the counter 6. The information updating section 12 receives the number of copied sheets, reads out the accumulated number of copied sheets included in the wireless tag information stored in the information storage section 13, adds the received number of copied sheets to the accumulated number of copied sheets so as to obtain the newly accumulated number of copied sheets, and stores, via the wireless tag communication section 11, the newly accumulated number of copied sheets in the wireless tag 51 attached to the book 50 (S41).

When it is judged in the step S38 that the relation $X+Y \leq Z$ is not satisfied (No in S38), the operation allowance judging section 14 transmits, to the job process section 3, disallowance information indicating that copy operation is not allowable (S42) and causes the display section 5 to display a warning informing the user that copy is disallowable (S43), and finishes the process.

Further, in addition to the above example, the present invention may be arranged so that whether copy operation is allowable or not is judged based on whether a predetermined time has passed or not since the last time when copy operation was performed. The following explains this case.

Figure 6:
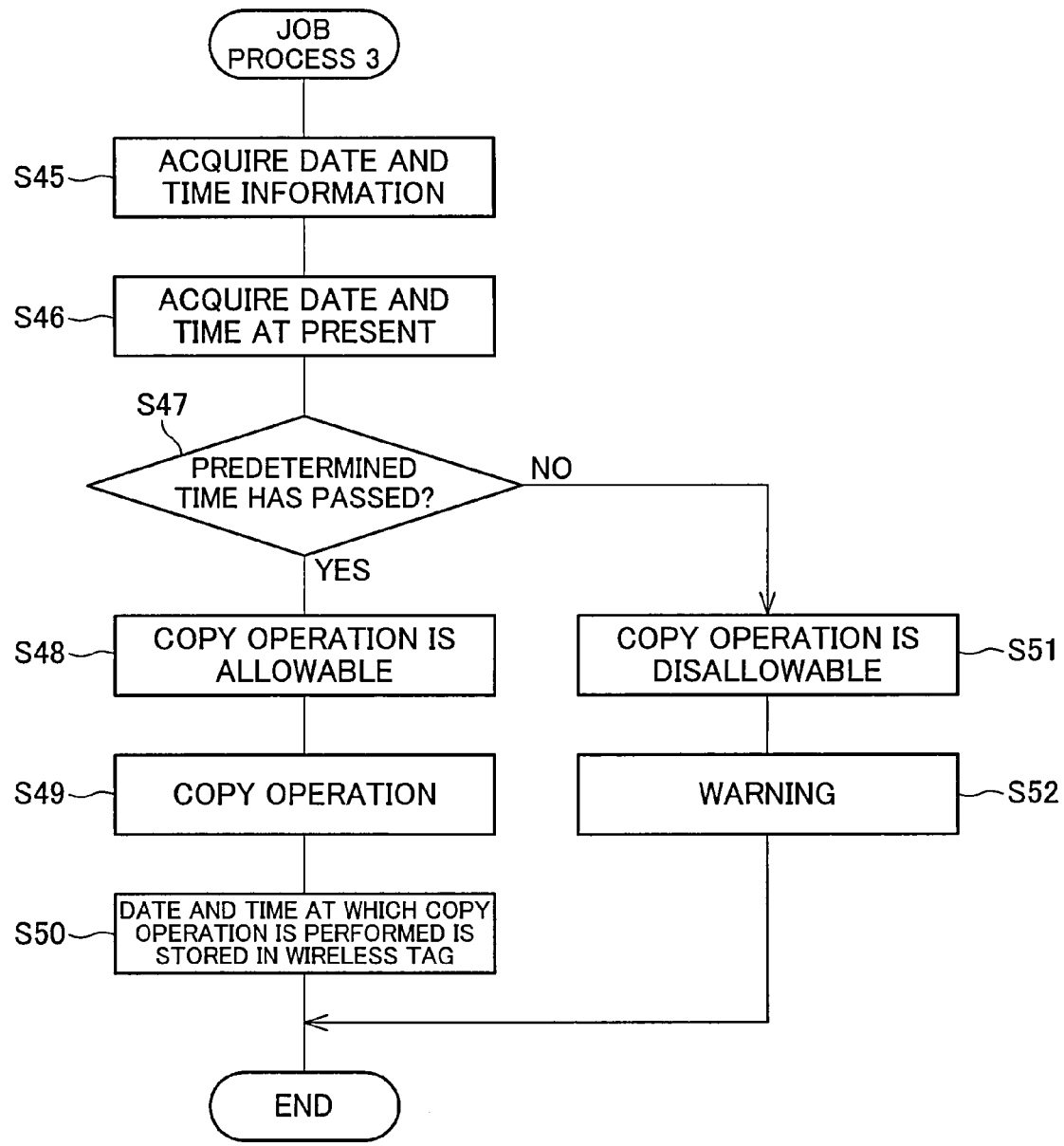
FIG. 6 is a flow chart illustrating a further example of a job process.

FIG. 6 is a flowchart explaining Job Process 3 in which: whether copy operation is allowable or not is judged based on whether a predetermined time has passed or not since the last time when copy operation was performed.

When it is judged in the step S18 that the owner information is identical with the user information, the operation allowance judging section 14 causes the date and time information judging section 26 to acquire date and time information (history information) included in the wireless tag information stored in the information storage section 13 (S45).

Next, the operation allowance judging section 14 causes the date and time information judging section 26 to acquire date and time at present from the timer 15 (S46).

Then, the operation allowance judging section 14 causes the date and time information judging section 26 to compare the date and time information with the date and time at present and thus judges whether a predetermined time has passed or not in accordance with a period from (i) a time when copy operation was performed and which is nearest to the present time to (ii) the present time. In other words, the operation allowance judging section 14 judges whether a predetermined time has passed or not since the last time when copy operation was performed (S47).

When it is judged in the step S47 that a predetermined time has passed (Yes in S47), the operation allowance judging section 14 transmits, to the job process section 3, allowance information indicating that copy operation is allowable (S48).

The job process section 3 receives the allowance information and performs copy operation (S49). When the copy operation is finished, the job process section 3 informs the information updating section 12 that copy operation is finished. The information updating section 12 receives the information and causes the date and time updating section 22 to acquire date and time at present by referring to the timer 15. The information updating section 12 stores, via the wireless tag communication section 11, the date and time at present serving as the date and time information in the wireless tag 51 attached to the book 50 (S50).

When it is judged in the step S47 that a predetermined time has not passed (No in S47), the operation allowance judging section 14 transmits, to the job process section 3, disallowance information indicating that copy operation is disallowable (S51) and causes the display section 5 to display a warning informing the user that copy operation is not allowable (S52), and finishes the process.

As described above, the controller 2 according to the present embodiment for controlling a digital multifunctional device 1 (image forming apparatus) is the controller 2 for controlling the digital multifunctional device 1 which performs job process operation including at least one of (i) image reading operation for reading a document so as to acquire image data and (ii) image forming operation for forming an image indicated by the image data on a sheet, the controller 2 comprising: the user information acquiring section 16 for acquiring, from an outside, user information indicating a user who uses the digital multifunctional device 1; the wireless tag information acquiring section 20 for acquiring information stored in the wireless tag 51 attached to the book 50; the owner information judging section 27 for judging whether owner information indicating an owner of the book 50 is included or not in the information acquired by the wireless tag information acquiring section 20; and the operation allowance judging section 14 for (i) comparing the owner information with the user information in case where the owner information is included, so as to allow the job process operation when the owner information is identical with the user information and so as not to allow the job process operation when the owner information is not identical with the user information, and (ii) not allowing the job process operation in case where the user information is not included.

Further, a method according to the present invention is a method for causing the controller 2 to control the digital multifunctional device 1 which includes the user information acquiring section 16, the wireless tag information acquiring section 20, the owner information judging section 27, and the operation allowance judging section 14 and which performs job process operation including at least one of (i) image reading operation for reading the book 50 so as to acquire image data and (ii) image forming operation for forming an image indicated by the image data on a sheet, the method comprising the steps of: (i) causing the user information acquiring section 16 to acquire, from the outside, user information indicating a user who uses the digital multifunctional device 1; (ii) causing the wireless tag information acquiring section 20 to acquire information stored in the wireless tag 51 attached to the book 50; (iii) causing the owner information judging section 27 to judge whether owner information indicating an owner of the book 50 is included or not in the information acquired in the step (ii); and (iv) causing the operation allowance judging section 14 to compare the owner information with the user information in case where it is judged in the step (iii) that the owner information is included in the information acquired in the step (ii), so as to allow the job process operation when the owner information is identical with the user information and so as not to allow the job process operation when the owner information is not identical with the user information, and causing the operation allowance judging section 14 not to allow the job process operation in case where it is judged in the step (iii) that the owner information is not included in the information acquired in the step (ii).

The image data indicative of the image formed on the sheet in the image forming operation may be image data read out in the image reading operation or may be image data acquired from an outside.

The controller 2 controls the job process operation including at least one of the image reading operation and the image forming operation performed by the digital multifunctional device 1. Note that, the controller 2 may control both the image reading operation and the image forming operation or may control either the image reading operation or the image forming operation.

Further, the wireless tag 51 is attached to the book 50 and stores, for example, the owner information indicating the owner of the book 50. The wireless tag 51 may be at least one of a storage device (storage element) for storing data, such as an IC tag (wireless tag 51) and a flash memory, a paper, and the like.

The user information acquiring section 16 acquires user information indicative of a user who causes the digital multifunctional device 1 to perform the job process operation. To be specific, the user information acquiring section 16 acquires user information in such a manner that: the user information acquiring section 16 acquires information inputted by the user or reads out the user information from a user information storage medium for storing user information. The user information storage medium may be at least one of a storage device (storage element) for storing data, such as an IC tag (wireless tag 51), the IC card 60, and a flash memory, a paper, and the like.

With the arrangement, in a case where the owner information is stored in the wireless tag 51 attached to the book 50, the owner information is compared with the user information acquired from the outside. When the user information is identical with the owner information, the controller 2 allows the digital multifunctional device 1 to perform the job process operation. On the other hand, in a case where the owner information is not stored in the wireless tag 51, the controller 2 does not allow the digital multifunctional device 1 to perform the job process operation.

Namely, when the user information having the same information as the owner information indicating the owner of the book 50 is read out, the job process operation is allowable. When the owner information is not stored in the book 50, in other words, when the owner of the book 50 is unknown, the job process operation is not allowable.

Therefore, with the arrangement, it is possible to allow the owner of the book 50 to perform the job process operation and to prevent a person other than the owner of the book 50 from performing the job process operation. As a result, it is possible to prevent the job process operation from being performed for a purpose other than personal use.

Further, the controller 2 according to the present invention may be arranged so that: the frequency information judging section 28 acquires cumulative frequency with which the job process operation has been performed with respect to the book 50 out of the information acquired by the wireless tag information acquiring section 20, and the operation allowance judging section 14 does not allow the job process operation when the operation allowance judging section 14 judges that the cumulative frequency read out by the frequency information judging section 28 is not less than a predetermined value.

The cumulative frequency with which the job process operation has been performed may be a sum of (i) accumulated number of times the image forming operation has been performed and (ii) accumulated number of times the image reading operation has been performed or may be either of the above accumulated number of times.

With the arrangement, when the cumulative frequency with which the job process operation has been performed and which is stored in the wireless tag 51 is not less than a predetermined value, the job process operation is not allowable.

As a result, even when the owner information is stored in the wireless tag 51, it is possible to prevent the job process operation from being performed too much.

Further, the controller 2 according to the present invention may be arranged so that: the date and time information judging section 26 acquires data and time information indicating when the job process operation is performed with respect to the book 50 out of the information acquired by the wireless tag information acquiring section 20 and the data and time information judging section 26 acquires the latest date and time information out of the read out date and time information, and the operation allowance judging section 14 does not allow the job process operation when the operation allowance judging section 14 judges that a predetermined time has not passed in accordance with a period from (i) a time when copy operation was performed and which is nearest to the present time to (ii) the present time, the time being read out by the date and time information judging section 26.

The "time . . . nearest to the present time" is a time when the newest job process operation was performed by the digital multifunctional device 1.

With the arrangement, when it is judged that a predetermined time has not passed since the time when the latest job process operation was performed, the job process operation is not allowable. As a result, even when the owner information is stored in the wireless tag 51, it is possible to prevent the job process operation from being performed serially.

Further, the controller 2 according to the present invention may be arranged so that: the owner information judging section 27 judges whether limitation information for limiting the job process operation is included or not in the information acquired by the wireless tag information acquiring section 20 before judging whether the owner information is included or not in the information acquired by the wireless tag information acquiring section 20, and the operation allowance judging section 14 causes the owner information judging section 27 to judge whether the owner information is included or not when the limitation information is included, and the operation allowance judging section 14 allows the job process operation without causing the owner information judging section 27 to judge whether the owner information is included or not when the limitation information is not included.

The limitation information is information for limiting the number of times the job process operation is performed or for preventing the job process operation. An example of the limitation information is copyright protection information.

With the arrangement, first, it is judged whether the limitation information is included in the wireless tag 51 or not. When the limitation information is not included, namely, when there is no need to limit or prevent the job process operation, the operation allowance judging section 14 allows the job process operation. Further, when the limitation information is included, the operation allowance judging section 14 causes the owner information judging section 27 to judge whether the owner information is included or not.

As a result, when there is no limitation information, the job process operation is allowed regardless of the owner because there is no need to limit the job process operation. On the other hand, when there is the limitation information, the job process operation is allowed only for the owner.

Further, the controller 2 according to the present invention may be arranged so that: the operation allowance judging section 14 allows only one job process operation when the limitation information is included.

With the arrangement, only one job process operation is allowed when the limitation information is included. Therefore, it is possible to limit the job process operation for a purpose other than personal use.

Further, the controller 2 according to the present embodiment is a controller for controlling the image reading operation and/or image forming operation performed by the digital multifunctional device 1 including at least one of (i) the image reading section 31 for reading the book 50 so as to acquire image data and (ii) the image forming section 32 for forming an image indicated by the image data on a sheet, the controller 2 including: the user information acquiring section 16 for acquiring user information indicating a user who uses the digital multifunctional device 1 from a user information storage medium which previously stores the user information; the wireless tag communication section 11 for acquiring information stored in the wireless tag 51 attached to the book 50; the owner information judging section 27 for judging whether the owner information indicating the owner of the book 50 is included or not in the information acquired by the wireless tag communication section 11; and the operation allowance judging section 14 for comparing the owner information with the user information when the owner information is included and for allowing the image forming operation and/or image reading operation when the owner information is identical with the user information while not allowing the job process operation when the owner information is not identical with the user information or when the owner information is not included.

Further, the digital multifunctional device 1 according to the present embodiment is a digital multifunctional device including: the image reading section 31 for reading image data from the book 50; the image forming section 32 for forming an image on a storage medium on the basis of the read out image data; the wireless tag communication section 11 for communicating with a document information storage medium (wireless tag 51) which is attached to the book 50 and previously stores the owner information; the user information acquiring section 16 for communicating with the user information storage medium (IC card 60) which previously stores user information; and the operation allowance judging section 14 for judging whether operations of the image reading section 31 and the image forming section 32 are allowable or not, wherein the operation allowance judging section 14 allows the image reading section 31 and the image forming section 32 to operate when the owner information acquired from the wireless tag 51 via the wireless tag communication section 11 is identical with the user information acquired from the IC card 60 by the user information acquiring section 16. The arrangement allows only the owner of the book 50 to copy the book 50 by use of the digital multifunctional device 1. Therefore, it is possible to prevent the book 50 from being copied for a purpose other than personal use.

Further, the present invention may be arranged so that: the wireless tag 51 includes a region which previously stores the number of copiable sheets and which stores the number of copied sheets, the wireless tag communication section 11 of the digital multifunctional device 1 acquires the number of copied sheets from the wireless tag 51 and when copy is newly performed, the wireless tag communication section 11 adds the number of newly copied sheets to the number of copied sheets, and the operation allowance judging section 14 allows the image reading section 31 and the image forming section 32 to operate while the accumulated number of copied sheets is less than the number of copiable sheets. As a result, it is possible to prevent the book 50 from being copied too much for a purpose other than personal use.

Further, the present invention may be arranged so that: the region for storing the number of copied sheets stores the number per a predetermined time, and the digital multifunctional device 1 further includes (i) timing means for providing the date and time information and (ii) the information updating section 12 for updating the number of copied sheets acquired from the wireless tag 51 on the basis of the date and time information. As a result, it is possible to allow a copy at a suitable interval, which is supposed to be performed for personal use.

Further, the present invention may be arranged so that: the wireless tag 51 previously stores copyright information indicating whether the document is under copyright protection or not, and when the copyright information acquired from the wireless tag 51 via the wireless tag communication section 11 indicates that the document is not under copyright protection, the operation allowance judging section 14 of the digital multifunctional device 1 allows the image reading section 31 and the image forming section 32 to operate regardless of any other condition. As a result, it is possible to freely copy the book 50 which is not under copyright protection.

Further, the present invention may be arranged so that: the wireless tag 51 previously stores copyright information indicating whether the book 50 (document) is under copyright protection or not, and when the copyright information acquired from the wireless tag 51 via the wireless tag communication section 11 indicates that the book 50 is under copyright protection, the operation allowance judging section 14 of the digital multifunctional device 1 sets the number of copiable sheets to 1. As a result, it is possible to prevent the book 50 from being copied as many as two or more for a purpose other than personal use.

Note that, the foregoing explains a case where the wireless tag 51 is attached as an information storage medium to the book 50. However, the information storage medium attached to the book 50 is not limited to the wireless tag 51 as long as the information storage medium can store the same information as the wireless tag information. Namely, the information storage medium is not particularly limited as long as it can store various items of information. Examples of the information storage medium include magnetic storage mediums such as a flash memory and a hard disc and a paper and the like which record the same information as the wireless tag information. Note that, in a case where the information storage medium is a paper, the image reading section 31 should read information stored in the information storage medium. Further, the foregoing explains a case where the wireless tag information stored in the wireless tag 51 attached to the book 50 is wirelessly read out. However, the wireless tag information may be read out by wired communication.

Here, the following explains an information input device 100 for storing, in the wireless tag 51 attached to the book 50, (i) an owner ID serving as the owner information and (ii) the number of copiable sheets for limiting the number of copies.

Figure 7:
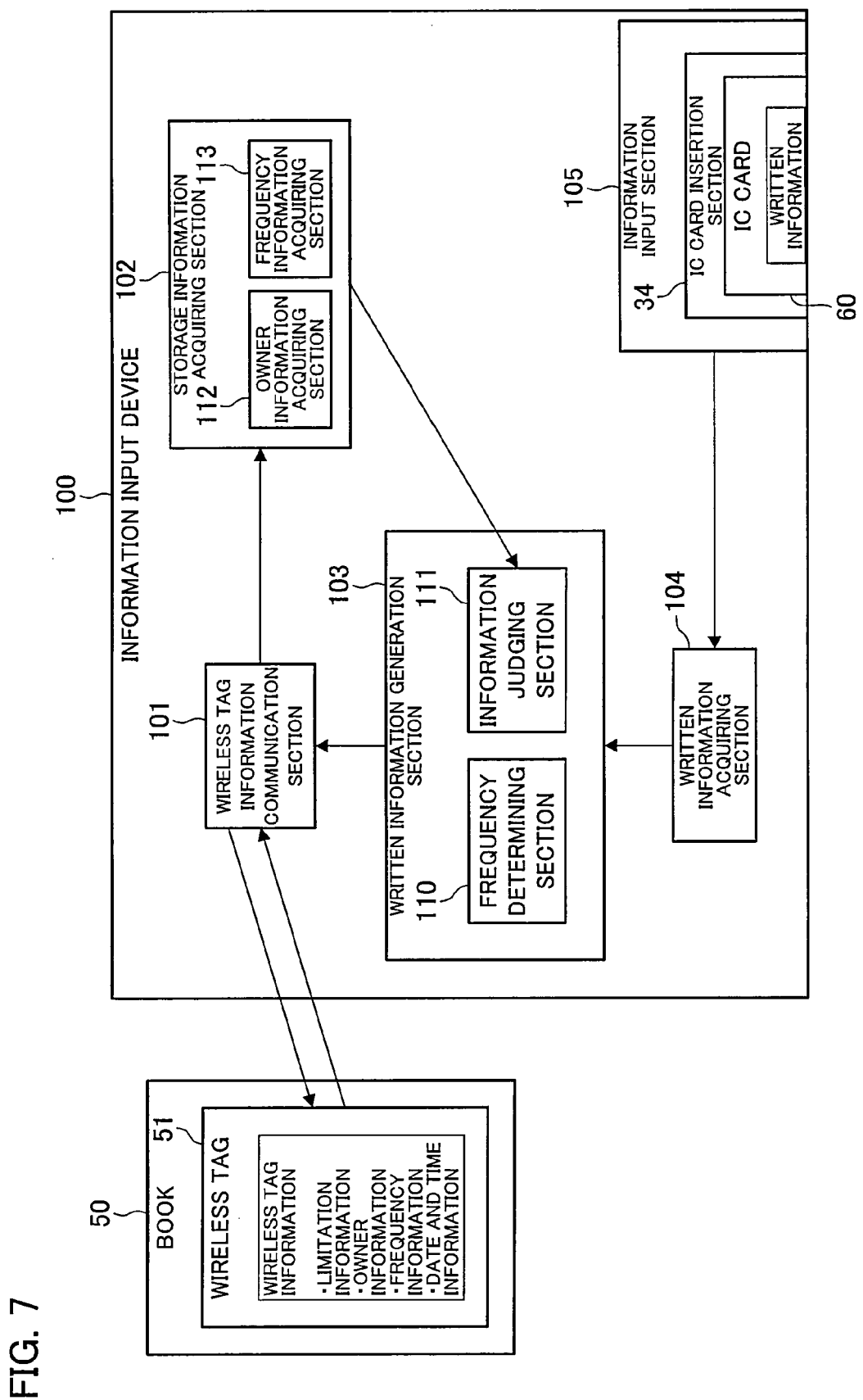
FIG. 7 is a block diagram schematically illustrating a structure of an information input device according to the present embodiment.

FIG. 7 is a block diagram schematically illustrating a structure of the information input device 100 according to the present embodiment. The information input device 100 includes a wireless tag information communication section 101, a written information generation section 103, a written information acquiring section 104, a storage information acquiring section 102, an information input section 105, and an IC card insertion section 34.

The wireless tag information communication section 101 writes information in/reads information from the wireless tag 51 attached to the book 50.

The storage information acquiring section 102 acquires, via the wireless tag information communication section 101, the information stored in the wireless tag 51. The storage information acquiring section 102 includes an owner information acquiring section 112 and a frequency information acquiring section 113.

The owner information acquiring section 112 acquires owner information included in the wireless tag information stored in the wireless tag 51.

The frequency information acquiring section 113 acquires frequency information included in the wireless tag information.

An IC card 60 is inserted into the IC card insertion section 34 (IC card slot) from an outside.

The written information acquiring section 104 acquires written information stored in the IC card 60 inserted into the IC card insertion section 34. Further, the written information acquiring section 104 acquires the written information from the information input section 105. Note that, the written information is information to be written in the wireless tag 51 attached to the book 50. To be specific, the written information is owner information for indicating the owner of the book 50, and the like.

The written information generation section 103 generates information to be written in the wireless tag 51 attached to the book 50. The written information generation section 103 includes a frequency determining section 110 and an information judging section 111.

The information judging section 111 judges whether information is to be written in the wireless tag 51 or not based on the information acquired by the storage information acquiring section 102.

The frequency determining section 110 determines the frequency to be written in the wireless tag 51, namely, the number of copiable sheets. Note that, the frequency determining section 110 may determine the number of copiable sheets (frequency) based on information such as the size or the number of pages of the book 50 or may set the number of copiable sheets to a predetermined number.

The following explains a method for writing information in the wireless tag 51 by use of the information input device 100 having the above arrangement.

First, when the user inserts the IC card 60 into the IC card insertion section 34, the written information acquiring section 104 acquires written information (owner information) stored in the IC card 60.

Next, the storage information acquiring section 102 acquires, via the wireless tag information communication section 101, wireless tag information stored in the wireless tag 51 attached to the book 50. Then, the information judging section 111 of the written information generation section 103 acquires the wireless tag information from the storage information acquiring section 102 and judges whether the owner information is to be written in the wireless tag 51 or not.

When it is judged that the owner information is to be written in the wireless tag 51, the written information generation section 103 generates written information to be stored in the wireless tag information. To be specific, the written information generation section 103 acquires written information acquired by the written information acquiring section 104 and generates the written information to be written in the wireless tag information.

Then, the written information generation section 103 stores, via the wireless tag information communication section 101, the generated written information in the wireless tag 51. In this way, the information input device 100 writes information in the wireless tag 51. The following explains further detailed process for writing information.

Figure 8:
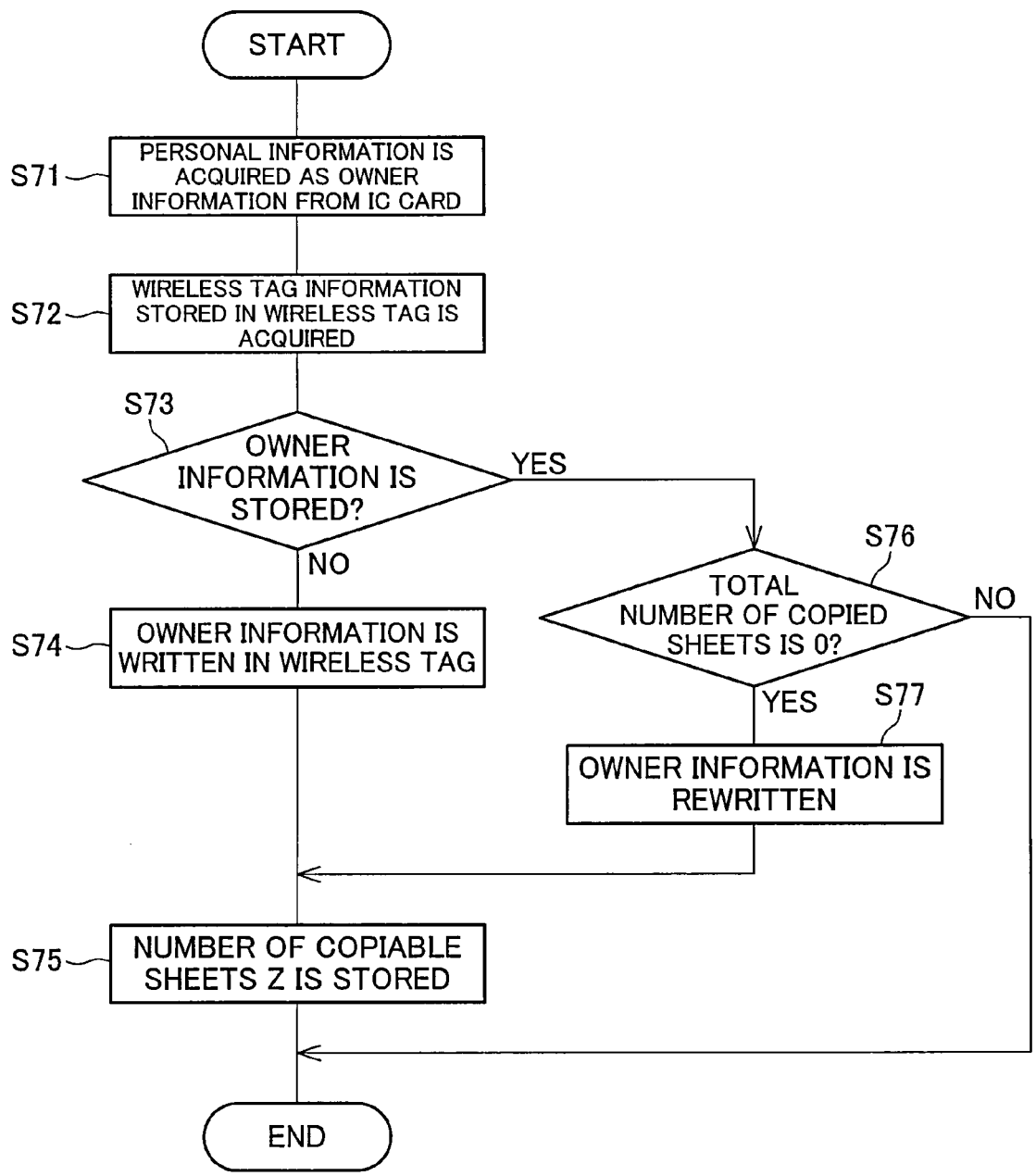
FIG. 8 is a flow chart illustrating how to cause the information input device to write owner information in the wireless tag.

FIG. 8 is a flow chart illustrating how to cause the information input device 100 to write owner information in the wireless tag 51.

First, the written information acquiring section 104 acquires, as owner information, personal information stored in the IC card 60 from the IC card 60 (S71).

Next, the storage information acquiring section 102 acquires wireless tag information from the wireless tag 51 via the wireless tag information communication section 101 (S72). To be specific, the storage information acquiring section 102 causes the owner information acquiring section 112 to acquire the owner information stored in the wireless tag information. Further, the storage information acquiring section 102 causes the frequency information acquiring section 113 to acquire frequency information (accumulated number of copied sheets) included in the wireless tag information.

Next, the written information generation section 103 causes the information judging section 111 to judge whether the owner information is included or not in the wireless tag information acquired by the storage information acquiring section 102 (S73).

When it is judged in the step S73 that the owner information is not included (No in S73), the written information generation section 103 acquires the owner information from the written information acquiring section 104 and writes the owner information in the wireless tag 51 via the wireless tag information communication section 101 (S74).

Further, the written information generation section 103 writes the number of copiable sheets in the wireless tag 51 (S75). Then, the process is finished.

On the other hand, when it is judged in the step S73 that the owner information is included (Yes in S73), the written information generation section 103 causes the information judging section 111 to judge whether the accumulated number of copied sheets included in the wireless tag information acquired by the storage information acquiring section 102 is 0 or not (S76).

When it is judged in the step S76 that the accumulated number of copied sheets is 0 (Yes in S76), the written information generation section 103 acquires the owner information from the written information acquiring section 104 and rewrites, via the wireless tag information communication section 101, the owner information stored in the wireless tag 51 into the owner information acquired from the written information acquiring section 104 (S77). Then, the process goes to the step S75.

On the other hand, when it is judged in the step S76 that the accumulated number of copied sheets is not 0 (No in S76), the process is finished.

Note that, in the step S75, the number of copiable sheets is stored. The following specifically explains a process for calculating the number of copiable sheets.

Figure 9:
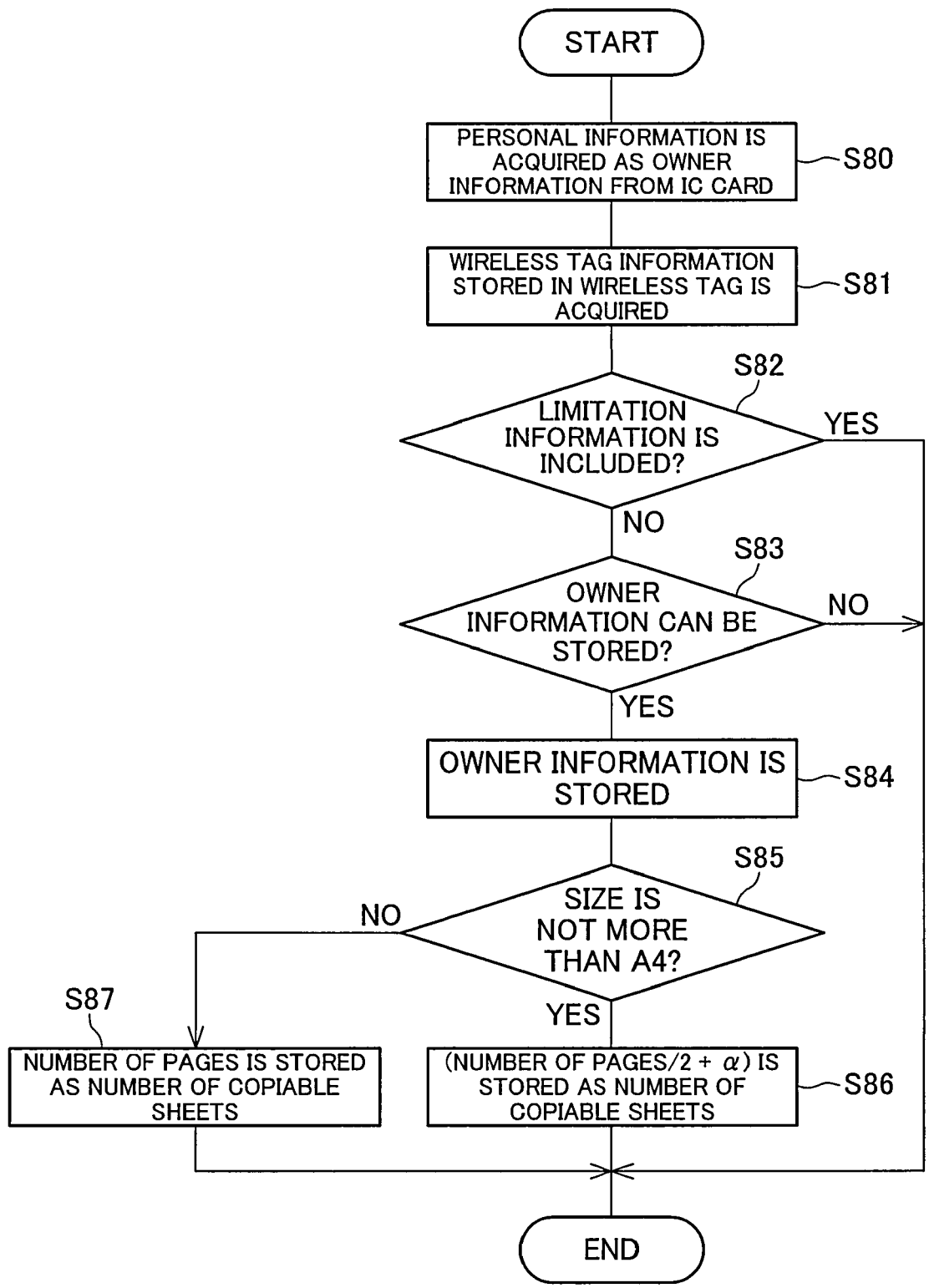
FIG. 9 is a flow chart illustrating how to calculate the number of copiable sheets based on the number of pages and the size of a book and to write the number of copiable sheets in the wireless tag.

FIG. 9 is a flow chart explaining a process in which the number of copiable sheets is calculated based on the number of pages and the size of the book 50 and is written in the wireless tag 51.

First, when the user inserts the IC card 60 storing the written information into the IC card insertion section 34, the written information acquiring section 104 acquires the written information including personal information from the IC card 60 (S80).

Next, the storage information acquiring section 102 causes the wireless tag information communication section 101 to acquire the wireless tag information stored in the wireless tag 51 attached to the book 50 (S81). To be specific, the owner information acquiring section 112 of the storage information acquiring section 102 acquires the owner information stored in the wireless tag 51. Further, the frequency information acquiring section 113 acquires frequency information stored in the wireless tag 51. Note that, when the owner information is not stored in the wireless tag 51, the owner information acquiring section 112 judges that the owner information is not included in the wireless tag 51, instead of acquiring the owner information.

Then, the information judging section 111 of the written information forming section 103 judges whether limitation information (copy disallowance (copy limitation) information) is included in the wireless tag information acquired by the storage information acquiring section 102 (S82).

When it is judged in the step S82 that the limitation information is not included (No in S82), the information judging section 111 refers to the wireless tag information and judges whether new owner information can be stored or not (S83). To be specific, the information judging section 111 judges whether the owner information is stored in the wireless tag information or not. In a case where the owner information is not stored, the information judging section 111 judges that new owner information can be stored. Further, in a case where the owner information is stored, when the frequency information acquired by the frequency information acquiring section 113 is indicative of "0", namely, when the book 50 to which the wireless tag 51 is attached has never been copied so far, the information judging section 111 judges that new owner information can be stored. In a case other than the above two cases, namely, a case where the owner information has been already stored in the wireless tag 51 and the book 50 has been already copied (the frequency information is not indicative of "0"), the information judging section 111 judges that new owner information cannot be stored.

When it is judged in the step S83 that new owner information can be stored (Yes in S83), the written information generation section 103 stores the new owner information in the wireless tag 51 based on written information acquired by the written information acquiring section 104 (S84).

Next, the frequency determining section 110 of the written information generation section 103 determines the number of copiable sheets based on size information (the size of the book 50) and page information (the number of pages of the book 50) included in the wireless tag information acquired by the storage information acquiring section 102. To be specific, the frequency determining section 110 refers to the size information included in the wireless tag information and judges whether the size of the book 50 is not more than A4 or not (S85).

When it is judged in the step S85 that the size of the book 50 is not more than A4 (Yes in S85), the frequency determining section 110 calculates the number of (pages/2+α) based on the number of pages of the book 50 and stores the number of (pages/2+α) as the number of copiable sheets in the wireless tag 51 (S86), since it is possible to copy both pages (left page and right page) of the book 50 at once throughout almost all pages. The α may be any number and predetermined. Then, the process is finished.

On the other hand, when it is judged in the step S85 that the size of the book 50 is more than A4 (No in S85), the frequency determining section 110 stores the number of pages of the book 50 as the number of copiable sheets in the wireless tag 51 (S87). Then, the process is finished.

Further, when it is judged in the step S82 that the limitation information is included (Yes in S82), and when it is judged in the step S83 that new owner information cannot be stored (No in S83), the process is finished without writing the number of copiable sheets.

In this way, the information input device 100 determines the number of copiable sheets based on the page information and the size information of the book 50.

Note that, the foregoing explains a case where a process for acquiring written information stored in the IC card 60 is first carried out and then a process for acquiring the wireless tag information stored in the wireless tag 51 is carried out. However, the above processes may be carried out at once or may be carried out in the reverse order.

Further, the foregoing explains a case where the number of copiable sheets is determined based on whether the size of the book 50 is not more than A4 or not. However, the number of copiable sheets is not necessary determined based on whether the size of the book 50 is not more than A4 or not. The number of copiable sheets may be arbitrarily determined based on the size and the number of pages of the book 50.

Further, the foregoing explains a case where the page information and the size information are read out from the wireless tag 51. However, the page information and the size information may be inputted by use of the information input section 105 for example.

As described above, the information input device 100 according to the present embodiment for writing information in the wireless tag 51 attached to the book 50 is an information input device including the written information generation section 103 for storing at least owner information indicating an owner of the book 50 in the wireless tag 51 attached to the book 50, the information storage device including: the owner information acquiring section 112 for acquiring the owner information from an outside; the storage information acquiring section 102 for acquiring information stored in the wireless tag 51; and the information judging section 111 for judging whether the owner information is included or not in the information acquired by the storage information acquiring section 102, wherein the written information generation section 103 stores the owner information acquired by the owner information acquiring section 112 in the wireless tag 51 when the written information generation section 103 judges that the owner information is not included in the information acquired by the storage information acquiring section 102.

Further, the information storage method according to the present invention is a method for storing at least owner information indicting an owner of the book 50 in the wireless tag 51 attached to the book 50, by use of the information input device 100 including the owner information acquiring section 112, the storage information acquiring section 102, and the information judging section 111, the method including the steps of: (i) causing the owner information acquiring section 112 to acquire the owner information from an outside; (ii) causing the storage information acquiring section 102 to acquire information stored in the wireless tag 51; (iii) causing the information judging section 111 to judge whether the owner information is included or not in the information acquired in the step (ii); and (iv) causing the written information generation section 103 to store the owner information acquired by the owner information acquiring section 112 in the wireless tag 51 when it is judged that the owner information is not included in the information acquired in the step (ii).

The information input device 100 stores various items of information at least including the owner information in the wireless tag 51 attached to the book 50.

With the arrangement, the owner information indicating the owner of the book 50 is stored based on the information stored in the wireless tag 51. To be specific, the owner information acquired from the outside is stored when the owner information is not yet stored in the wireless tag 51. As a result, it is possible to write the owner information indicating the owner of the book 50.

Further, the information input device 100 according to the present embodiment may be arranged so that: in a case where it is judged that the owner information is included in the information acquired by the storage information acquiring section 102, when the written information generation section 103 judges that frequency with which the job process operation including at least one of the image reading operation and the image forming operation has been performed so far is included in the information acquired by the storage information acquiring section 102 and the frequency is 0, the written information generation section 103 stores the owner information acquired by the owner information acquiring section 112 in the wireless tag 51.

With the arrangement, in a case where the owner information is stored in the wireless tag 51, when the job process operation has not been performed so far, it is possible to store the owner information acquired from the outside. As a result, when the job process operation has not been performed so far, even when the owner information has already been stored, it is possible to rewrite the owner information into new one.

Further, the information input device 100 according to the present embodiment may be arranged so that: the book 50 includes plural pages, and there is provided the operation input section 4 or the storage information acquiring section 102 for acquiring (i) page information concerning the number of pages of the book 50 inputted from the outside and (ii) size information concerning the size of the book 50, and there is provided the frequency determining section 110 for determining, on the basis of the page information and the size information acquired by the operation input section 4 or the storage information acquiring section 102, frequency with which the job process operation including at least one of the image reading operation and the image forming operation is performed, and the written information generation section 103 stores the frequency determined by the frequency determining section 110 in the wireless tag 51.

For example, when the book 50 whose size is not more than A4 is copied, it is possible to copy both pages (left page and right page) of the book 50, namely, it is possible to copy two pages at once. On the other hand, when the book 50 whose size is A3 is copied, the normal copying machine (digital multifunctional device 1) copies one page of the book 50 at one time. In this way, the number of pages copiable at one time varies depending on the size of the book 50.

With the arrangement, the frequency with which the job process operation is performed is determined based on the size and the number of pages of the book 50. As a result, it is possible to set the frequency with which the job process operation is performed so that the frequency corresponds to the size of the book 50.

Further, the information input device 100 (owner information writing device) according to the present embodiment may be an information input device including: the wireless tag information communication section 101 for communicating with the document information storage medium (wireless tag 51) which is attached to the document and includes a region for storing the owner information; the written information acquiring section 104 for communicating with the user information storage medium (IC card 60) which previously stores the user information; and the writing control section (written information generation section 103) for controlling writing of the data in the wireless tag 51, wherein: when data in an owner information region acquired from the wireless tag 51 via the wireless tag information communication section 101 has a predetermined initial value, the written information generation section 103 causes the wireless tag information communication section 101 to write, in the wireless tag 51, as owner information, user information acquired by the written information acquiring section 104 from the user information storage medium. As a result, it is possible to prevent the owner information of the book 50 from being rewritten one after another. Therefore, it is possible to prevent the book 50 from being copied for a purpose other than personal use.

Further, the information input device 100 may be an information input device including: the wireless tag information communication section 101 for communicating with the document information storage medium (wireless tag 51) which is attached to the document and includes a region for storing owner information, the number of copiable sheets, and the number of copied sheets; the written information acquiring section 104 for communicating with the user information storage medium (IC card 60) which previously stores user information; and the written information generation section 103 for controlling writing of data in the wireless tag 51, wherein: when the total number of copied sheets is 0, the written information generation section 103 causes the wireless tag information communication section 101 to write, as owner information, in the wireless tag 51, the user information acquired by the written information acquiring section 104 from the user information storage medium. As a result, when copy is not performed at all or when a predetermined time has passed since the last time when copy was performed, the owner information may be rewritten because there is no possibility that the owner information of the book 50 is rewritten in turn.

Further, the present invention may be arranged so that: the wireless tag 51 previously stores the number of pages of the book 50, and the written information generation section 103 of the information input device 100 acquires the number of pages from the wireless tag 51 via the wireless tag information communication section 101, calculates the number of copiable sheets based on the number of pages, and causes the wireless tag information communication section 101 to write the number of copiable sheets in the wireless tag 51. As a result, it is possible to set the number of copiable sheets in accordance with the number of pages of the book 50.

Further, the present invention may be arranged so that: the wireless tag 51 previously stores the size of the book 50, and the written information generation section 103 of the information input device 100 acquires the number of pages and the size of the book 50 from the wireless tag 51 via the wireless tag information communication section 101, calculates the number of copiable sheets based on the number of pages and the size of the book 50, and causes the wireless tag information communication section 101 to write the number of copiable sheets in the wireless tag 51. As a result, it is possible to set the number of copiable sheets in accordance with the number of pages and the size of the book 50.

Further, the method according to the present embodiment for controlling the digital multifunctional device 1 may include the steps of (i) detecting that a document is placed on a document placement table, (ii) causing the wireless tag information communication section 101 to acquire owner information from the wireless tag 51 attached to the document, (iii) causing the written information acquiring section 104 to acquire user information from the user information storage medium, (iv) causing the operation allowance judging section 14 to judge whether the owner information is identical with the user information, and (v) validating copy start operation when the owner information is identical with the user information.

The present invention is not limited to the foregoing embodiments, and a variety of modifications are possible within the scope specified by claims. Embodiments obtained by combining technical means modified within the scope specified by claims are also included in technical scope of the present invention.

Each block of the controller 2 and the information input device 100 may be realized by hardware logic or may be realized by causing a CPU to execute software.

Namely, the controller 2 and the information input device 100 include: a CPU (central processing unit) for carrying out operation as instructed in a control program for realizing functions; a ROM (read only memory) that stores the program; a RAM (random access memory) that loads the program; a storage device (storage medium) such as a memory for storing the program and various items of data; and the like. The object of the present invention also can be realized in such a manner that the controller 2 and the information input device 100 are provided with a computer-readable storage medium for storing a program code (such as an executable program, an intermediate code program, and a source program) of a control program of the controller 2 and the information input device 100 which program serves as software for realizing the functions, and the computer (alternatively, CPU or MPU) reads out and executes the program code stored in the storage medium.

The storage medium is, for example, tapes such as a magnetic tape and a cassette tape, or discs such as magnetic discs (e.g. a floppy disc (registered trademark) and a hard disc), and optical discs (e.g. a CD-ROM, a MO, a MD, a DVD, and a CD-R), cards such as an IC card (including a memory card) and an optical card, or semiconductor memories such as a mask ROM, an EPROM, an EEPROM, and a flash ROM.

Further, the present invention may be arranged so that: the controller 2 and the information input device 100 are capable of being connected with a communication network and the program code is supplied to the controller 2 and the information input device 100 via the communication network. The communication network is not particularly limited. Examples of the communication network include the Internet, an intranet, an extranet, a LAN, an ISDN, a VAN, a CATV communication network, a virtual private network, a telephone line network, a mobile phone communication network, a satellite communication network. Further, a transmission medium that constitutes the communication network is not particularly limited. Examples of the transmission medium include (i) wired lines such as IEEE 1394, a USB, a power line carrier, a cable TV line, a telephone line, and an ADSL line and (ii) wireless such as an infrared ray (e.g. IrDA or remote controller), Bluetooth (registered trademark), 802.11 wireless, HDR, a portable phone network, a satellite line, and a digital terrestrial network. Note that the present invention can be realized by using a computer data signal embedded in a carrier wave, which is the program code that is electrically transmitted.

As described above, in the present invention, "means" does not necessarily indicate physical means but also indicates the function of each means realized by software. Further, the present invention may be arranged so that: the function of one means is realized by two or more physical means or the functions of two or more means are realized by one physical means.

As described above, the controller according to the present invention includes: user information acquiring means for acquiring, from an outside, user information indicating a user who uses the image forming apparatus; information acquiring means for acquiring information stored in an information storage medium attached to the document; owner information judging means for judging whether owner information indicating an owner of the document is included or not in the information acquired by the information acquiring means; and operation allowance means for (i) comparing the owner information with the user information in case where the owner information is included, so as to allow the job process operation when the owner information is identical with the user information and so as not to allow the job process operation when the owner information is not identical with the user information and (ii) not allowing the job process operation in case where the user information is not included.

Therefore, with the arrangement, it is possible to allow the owner of the book 50 to perform the job process operation and to prevent a person other than the owner of the book 50 from performing the job process operation. As a result, it is possible to prevent the job process operation from being performed for a purpose other than personal use.

Further, the information storage device according to the present invention includes owner information acquiring means for acquiring the owner information from an outside, storage information acquiring means for acquiring information stored in the information storage medium, and information judging means for judging whether the owner information is included or not in the information acquired by the storage information acquiring means, wherein the information writing means stores the owner information acquired by the owner information acquiring means in the information storage medium when the information writing means judges that the owner information is not included in the information acquired by the storage information acquiring means.

As a result, when the owner information indicating the owner of the document is not yet stored in the information storage medium, it is possible to write the owner information acquired from the outside in the information storage medium.

Here, the controller according to the present invention may be arranged so that: the information storage medium stores cumulative frequency with which the job process operation has been performed with respect to the document, and there is provided the frequency information acquiring section for acquiring the cumulative frequency from the information acquired by the wireless tag information acquiring section, and the operation allowance section does not allow the job process operation when the operation allowance section judges that the cumulative frequency read out by the frequency information acquiring section is not less than a predetermined value.

The cumulative frequency with which the job process operation is performed may be a sum of (i) accumulated number of times the image forming operation is performed and (ii) accumulated number of times the image reading operation is performed or may be either of the above accumulated number of times.

With the arrangement, when the frequency with which the job process operation is performed, which frequency is stored in the wireless tag 51, is not less than a predetermined value, the job process operation is not allowable.

As a result, even when the owner information is stored in the wireless tag 51, it is possible to prevent the job process operation from being performed too much.

Further, the controller according to the present invention may be arranged so that: the information storage medium stores date and time information indicating when the job process operation has been performed with respect to the document; there is provided the date and time information judging section for acquiring latest data and time information out of the information acquired by the wireless tag information acquiring section; and the operation allowance judging section does not allow the job process operation when the operation allowance judging section judges that a predetermined time has not passed since a time indicated by the latest date and time information.

The "latest date and time information" is date and time information indicating a time when the newest job process operation has been performed by the job process section.

With the arrangement, when it is judged that a predetermined time has not passed since the time when the latest job process operation was performed, the job process operation is not allowed. As a result, even when the owner information is stored in the information storage medium, it is possible to prevent the job process operation from being performed serially.

Further, the controller according to the present invention may be arranged so that: the owner information judging section judges whether limitation information for limiting the job process operation is included or not in the information acquired by the wireless tag information acquiring section before judging whether the owner information is included or not in the information acquired by the wireless tag information acquiring section, and the operation allowance judging section causes the owner information judging section to judge whether the owner information is included or not when the limitation information is included, and the operation allowance judging section allows the job process operation without causing the owner information judging section to judge whether the owner information is included or not when the limitation information is not included.

The limitation information is information for limiting the number of times the job process operation is performed or for preventing the job process operation. An example of the limitation information is copyright protection information.

With the arrangement, first, it is judged whether the limitation information is included or not in the information storage medium. When the limitation information is not included, namely, when there is no need to limit or prevent the job process operation, the job process operation is allowed. Further, when the limitation information is included, the owner information judging section judges whether the owner information is included or not.

As a result, when there is no limitation information, the job process operation is allowed regardless of the owner because there is no need to limit the job process operation. On the other hand, when there is the limitation information, the job process operation is allowed only for the owner.

Further, the controller according to the present invention may be arranged so that: the operation allowance judging section allows only one job process operation when the limitation information is included.

With the arrangement, only one job process operation is allowed when the limitation information is included and the owner information is identical with the user information. Namely, in order to prevent illegal job process operation for a purpose other than personal use, even a legal owner of a document is allowed to perform only one job process operation. Therefore, it is possible to limit the job process operation for a purpose other than personal use.

Further, the information storage device according to the present invention may be arranged so that: the information storage medium stores frequency with which job process operation including at least one of image reading operation and image forming operation has been performed so far, and when it is judged that the owner information is included in the information acquired by the storage information acquiring section, the written information forming section stores the owner information acquired by the owner information acquiring section in the information storage medium upon determining that the frequency is included in the information acquired by the storage information acquiring means and the frequency is 0.

With the arrangement, in a case where the owner information is stored in the information storage medium, when the job process operation has not been performed so far, it is possible to store the owner information acquired from the outside. As a result, in case where the job process operation has not been performed so far, even when the owner information has already been stored, it is possible to rewrite the owner information into new one.

The information storage device according to the present invention may be arranged so that: the document includes plural pages, and there is provided the storage information acquiring section for acquiring, from the outside, (i) page information concerning the number of pages of the document and (ii) size information concerning the size of the document, the frequency determining section for determining, on the basis of the page information and the size information acquired by the storage information acquiring section, frequency with which the job process operation including at least one of the image reading operation and the image forming operation is performed, and the written information forming section stores the frequency determined by the frequency determining section in the information storage medium.

For example, when a document whose size is not more than A4 is copied, it is possible to copy both pages (left page and right page) of document, namely, it is possible to copy two pages at once. On the other hand, when the document whose size is A3 is copied, the normal copying machine (job process section) copies one page of document at one time. In this way, the number of pages copiable at one time varies depending on the size of the document.

With the arrangement, the number of times the job process operation is performed is determined based on the size and the number of pages of the document. As a result, it is possible to set the number of times the job process operation is performed so that the number corresponds to the size of the document.

Note that, the controller and the information storage device may be realized by a computer. At that time, the present invention also includes (i) a program for causing the computer to function as each of the sections of the controller and the information storage device, thereby realizing the controller and the information storage device by use of the computer, and (ii) a computer-readable storage medium for storing the program.

Further, the method according to the present invention is a method for causing a controller to control an image forming apparatus which includes user information acquiring means, information acquiring means, owner information judging means, and operation allowance means and which performs job process operation including at least one of (i) image reading operation for reading a document so as to acquire image data and (ii) image forming operation for forming an image indicated by the image data on a sheet, said method comprising the steps of: (i) causing the user information acquiring means to acquire, from the outside, user information indicating a user who uses the image forming apparatus; (ii) causing the information acquiring means to acquire information stored in the information storage medium attached to the document; (iii) causing the owner information judging means to judge whether owner information indicating an owner of the document is included or not in the information acquired in the step (ii); and (iv) causing the operation allowance means to compare the owner information with the user information in case where it is judged in the step (iii) that the owner information is included in the information acquired in the step (ii), so as to allow the job process operation when the owner information is identical with the user information and so as not to allow the job process operation when the owner information is not identical with the user information, and not allowing the job process operation in case where it is judged in the step (iii) that the owner information is not included in the information acquired in the step (ii).

Further, the method according to the present invention is a method for storing at least owner information indicting an owner of a document in an information storage medium attached to the document, by use of an information storage device including owner information acquiring means, storage information acquiring means, and information judging means, said method comprising the steps of: (i) causing the owner information acquiring means to acquire the owner information from the outside; (ii) causing the storage information acquiring means to acquire information stored in the information storage medium; (iii) causing the information judging means to judge whether the owner information is included or not in the information acquired in the step (ii); and (iv) causing the information writing means to store the owner information acquired in the step (i) in the information storage medium when it is judged that the owner information is not included in the information acquired in the step (ii).

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A controller according to the present invention is favorably used so as to control an image forming apparatus or an image reading apparatus for copying a book or the like under copyright protection.

What is claimed is:

1. A controller for controlling an image forming apparatus which performs job process operations including at least one of (a) an image reading operation for reading a book so as to acquire image data and (b) an image forming operation for forming an image indicated by the image data on a sheet, said controller comprising:
   user information acquiring means for acquiring, from an outside source, user information indicating a user who uses the image forming apparatus;
   information acquiring means for acquiring information including book information of the book, owner information indicating an owner of the book, allowance frequency information indicating frequency with which the job process operation performed with respect to the book is allowed, cumulative frequency information indicating cumulative frequency with which the job process operation has been performed with respect to the book, and date and time information indicating when the job process operation has been performed with respect to the book, each of which is stored in a wireless tag attached to the book;
   owner information judging means for judging whether the owner information is included or not in the information acquired by the information acquiring means;
   operation allowance means for (i) comparing the owner information with the user information in the case where the owner information is included so as to allow the job process operation when the owner information is identical with the user information and so as not to allow the job process operation when the owner information is not identical with the user information and (ii) not allowing the job process operation in the case where the user information is not included;
   frequency acquiring means for acquiring the cumulative frequency from the information acquired by the information acquiring means;
   date and time information acquiring means for acquiring latest data and time information out of the information acquired by information acquiring means;
   frequency updating means for updating the cumulative frequency information stored in the wireless tag in accordance with the frequency with which the job process operation has been performed with respect to the book; and
   date and time updating means for updating the date and time information stored in the wireless tag in accordance with when the job process operation has been performed with respect to the book, wherein:
out of the information stored in the wireless tag, the book information, the owner information, and the allowance frequency information are stored so as to be unrewriteable by the user, and
even when the owner information is identical with the user information, the operation allowance means does not allow the job process operation when the cumulative frequency read out by the frequency acquiring means is not less than a predetermined value and/or when a predetermined time has not passed since a time indicated by the latest date and time information read out by the date and time information acquiring means.

2. The controller as set forth in claim 1, wherein:
the owner information judging means judges whether limitation information for limiting the job process operation is included or not in the information acquired by the information acquiring means before judging whether the owner information is included or not in the information acquired by the information acquiring means, and
the operation allowance means causes the owner information judging means to judge whether the owner information is included or not when the limitation information is included, and the operation allowance means allows the job process operation without causing the owner information judging means to judge whether the owner information is included or not when the limitation information is not included.

3. The controller as set forth in claim 2, wherein
the operation allowance means allows only one job process operation when the limitation information is included and the owner information is identical with the user information.

4. A control program embodied in a computer-readable storage medium which, when executed by a computer, causes the computer to function as each of the means of the controller as set forth in claim 1.

5. A method for controlling an image forming apparatus which performs job process operations including at least one of (a) an image reading operation for reading a book so as to acquire image data and (b) an image forming operation for forming an image indicated by the image data on a sheet, said method comprising the steps of:
  (i) acquiring, from an outside source, user information indicating a user who uses the image forming apparatus;
  (ii) acquiring information including book information of the book, owner information indicating an owner of the book, allowance frequency information indicating frequency with which the job process operation performed with respect to the book is allowed, cumulative frequency information indicating cumulative frequency with which the job process operation has been performed with respect to the book, and date and time information indicating when the job process operation has been performed with respect to the book, each of which is stored in a wireless tag attached to the book;
  (iii) judging whether the owner information is included or not in the information acquired in the step (ii);
  (iv) acquiring the cumulative frequency from the information acquired by the information acquiring means;
  (v) acquiring latest data and time information out of the information acquired by the information acquiring means;
  (vi) comparing the owner information with the user information in the case where it is judged in step (iii) that the owner information is included in the information acquired in the step (ii), so as to allow the job process operation when the owner information is identical with the user information and so as not to allow the job process operation when the owner information is not identical with the user information, and not allowing the job process operation in the case where it is judged in the step (iii) that the owner information is not included in the information acquired in the step (ii);
  (vii) updating the cumulative frequency information stored in the wireless tag in accordance with the frequency with which the job process operation has been performed with respect to the book; and
  (viii) updating the date and time information stored in the wireless tag in accordance with when the job process operation has been performed with respect to the book,
wherein:
out of the information stored in the wireless tag, the book information, the owner information, and the allowance frequency information are stored so as to be unrewriteable by the user, and
when the owner information is identical with the user information, the operation allowance means does not allow the job process operation when the cumulative frequency read out by the frequency acquiring means is not less than a predetermined value or when a predetermined time has not passed since a time indicated by the latest date and time information read out by the date and time information acquiring means.

* * * * *